US012681261B2

(12) United States Patent
Hu et al.

(10) Patent No.: US 12,681,261 B2
(45) Date of Patent: Jul. 14, 2026

(54) OPTICAL ELEMENT DRIVING MECHANISM

(71) Applicant: Actutek Corporation, Taoyuan City (TW)

(72) Inventors: Hsiao-Hsin Hu, Taoyuan City (TW); Chih-Wen Chiang, Taoyuan City (TW); Chia-Che Wu, Taoyuan City (TW); Yu-Chiao Lo, Taoyuan City (TW); Yi-Ho Chen, Taoyuan City (TW); Chao-Chang Hu, Taoyuan City (TW); Sin-Jhong Song, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 458 days.

(21) Appl. No.: 18/191,483

(22) Filed: Mar. 28, 2023

(65) Prior Publication Data

US 2024/0151932 A1      May 9, 2024

(30) Foreign Application Priority Data

Nov. 4, 2022 (CN) .......................... 202211378686.9

(51) Int. Cl.
$G02B$ 7/08 (2021.01)
$H02K$ 41/035 (2006.01)
(52) U.S. Cl.
CPC ........... G02B 7/08 (2013.01); H02K 41/0354 (2013.01)
(58) Field of Classification Search
CPC . G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; G03B 2205/00; G03B 2205/0007; G03B 2205/0053; G03B 2205/0069; G03B 3/02; G03B 3/10; G03B 5/00; G03B 5/04; G03B 13/36; G03B 30/00; H02K 11/21; H02K 11/33; H02K 41/0354; H02K 41/0356
USPC ....... 359/911, 554, 555, 557, 881, 813, 814, 359/824, 872, 877; 396/52, 55
See application file for complete search history.

(56) References Cited

U.S. PATENT DOCUMENTS

| | | | | |
|---|---|---|---|---|
| 2011/0052170 A1* | 3/2011 | Huang | ..................... | G03B 3/10 |
| | | | | 396/133 |
| 2018/0026515 A1* | 1/2018 | Park | ......................... | G03B 3/10 |
| | | | | 359/824 |
| 2020/0033559 A1* | 1/2020 | Huang | ............... | H02K 41/0356 |
| 2022/0026664 A1* | 1/2022 | Lin | .......................... | G03B 5/02 |

FOREIGN PATENT DOCUMENTS

CN          211698336 U      10/2020

* cited by examiner

*Primary Examiner* — Marin Pichler
(74) *Attorney, Agent, or Firm* — MUNCY, GEISSLER, OLDS & LOWE, P.C.

(57) ABSTRACT

An optical element driving mechanism is provided. The optical element driving mechanism includes a movable portion, a fixed portion, and a driving assembly. The movable portion is used to connect the optical element. The movable portion may move relative to the fixed portion. The driving assembly is used to drive the movable portion to move relative to the fixed portion.

18 Claims, 28 Drawing Sheets

1600

1131 { 1132
       1133

X
Y
Z

1132

1133

OPTICAL ELEMENT DRIVING MECHANISM

CROSS REFERENCE TO RELATED APPLICATIONS

This application claims priority of China Patent Application No. 202211378686.9, filed on Nov. 4, 2022, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

Some embodiments of the present disclosure provide an optical element driving mechanism that includes a movable portion, a fixed portion, and a driving assembly. The movable portion is used to connect the optical element. The movable portion may move relative to the fixed portion. The driving assembly is used to drive the movable portion to move relative to the fixed portion.

In some embodiments, the optical element driving mechanism further includes a first resilient element connecting the movable portion and the fixed portion, used for electrically connecting the optical element driving mechanism and an optical module, and a second resilient element disposed on the fixed portion. The first resilient element and the second resilient element are disposed on opposite sides of the movable portion in a first direction. The first resilient element and the second resilient element are different in thickness.

In some embodiments, a thickness of the first resilient element is less than a thickness of the second resilient element. The fixed portion includes a first side, a second side, a third side, and a fourth side. The driving assembly is disposed on the first side, the second side, the third side, and the fourth side. The first side is opposite to the third side. The second side is opposite to the fourth side. The fixed portion includes a case and a base arranged along a main axis, and the main axis extends in the first direction.

In some embodiments, when viewed along the main axis, the first resilient element includes a first resilient unit disposed on the first side, a second resilient unit disposed on the second side, a third resilient unit disposed on the second side, a fourth resilient unit disposed on the third side, a fifth resilient unit disposed on the third side, and a sixth resilient unit disposed on the fourth side.

In some embodiments, a first segment passes through the main axis when viewed along the main axis. The first resilient unit and the sixth resilient unit are symmetrical to the first segment. The second resilient unit and the fifth resilient unit are symmetrical to the first segment. The third resilient unit and the fourth resilient unit are symmetrical to the first segment.

In some embodiments, the optical element driving mechanism further includes a first guiding rod disposed on the fixed portion, and a second guiding rod disposed on the fixed portion. The first guiding rod and the second guiding rod are disposed on opposite sides of the movable portion. A second segment passes through the first guiding rod and the second guiding rod when viewed along the main axis. The first segment is perpendicular to the second segment.

In some embodiments, when viewed along the main axis, the first resilient unit and the sixth resilient unit are disposed on a side of the second segment, and the second resilient unit, the third resilient unit, the fourth resilient unit, and the fifth resilient unit are disposed on another side of the second segment. The second segment does not pass through the first resilient element.

In some embodiments, the first resilient unit includes a first movable portion connecting portion disposed on the movable portion, a first fixed portion connecting portion disposed on the fixed portion, and a first string connecting the first movable portion connecting portion and the first fixed portion connecting portion. The second resilient unit includes a second movable portion connecting portion disposed on the movable portion, a second fixed portion connecting portion disposed on the fixed portion, and a second string connecting the second movable portion connecting portion and the second fixed portion connecting portion. The third resilient unit includes a third movable portion connecting portion disposed on the movable portion, a third fixed portion connecting portion disposed on the fixed portion, and a third string connecting the third movable portion connecting portion and the third fixed portion connecting portion. The fourth resilient unit includes a fourth movable portion connecting portion disposed on the movable portion, a fourth fixed portion connecting portion disposed on the fixed portion, and a fourth string connecting the fourth movable portion connecting portion and the fourth fixed portion connecting portion. The fifth resilient unit includes a fifth movable portion connecting portion disposed on the movable portion, a fifth fixed portion connecting portion disposed on the fixed portion, and a fifth string connecting the fifth movable portion connecting portion and the fifth fixed portion connecting portion. The sixth resilient unit includes a sixth movable portion connecting portion disposed on the movable portion, a sixth fixed portion connecting portion disposed on the fixed portion, and a sixth string connecting the sixth movable portion connecting portion and the sixth fixed portion connecting portion.

In some embodiments, a distance between the first movable portion connecting portion and the first fixed portion connecting portion is greater than a distance between the second movable portion connecting portion and the second fixed portion connecting portion. A distance between the first movable portion connecting portion and the first fixed portion connecting portion is greater than a distance between the third movable portion connecting portion and the third fixed portion connecting portion. A distance between the sixth movable portion connecting portion and the sixth fixed portion connecting portion is greater than a distance between the fourth movable portion connecting portion and the fourth fixed portion connecting portion. A distance between the sixth movable portion connecting portion and the sixth fixed portion connecting portion is greater than a distance between the fifth movable portion connecting portion and the fifth fixed portion connecting portion.

In some embodiments, the second string includes a second string first portion connecting to the second movable portion connecting portion, a second string second portion connecting to the second fixed portion connecting portion, and a second string bending portion connecting the second string first portion and the second string second portion.

In some embodiments, the second string first portion and the second string second portion extend in different directions, and an angle between the second string first portion and the second string second portion is acute. A distance between the second movable portion connecting portion and the second fixed portion connecting portion is less than a length of the second string first portion. The distance between the second movable portion connecting portion and the second fixed portion connecting portion is less than a length of the second string second portion.

In some embodiments, the driving assembly includes, a first driving magnetic element disposed on the first side, a second driving magnetic element disposed on the second side, a third driving magnetic element disposed on the third side, a fourth driving magnetic element disposed on the fourth side, a first driving coil disposed on the movable portion and corresponding to the first driving magnetic element, a second driving coil disposed on the movable portion and corresponding to the second driving magnetic element, a third driving coil disposed on the movable portion and corresponding to the third driving magnetic element, and a fourth driving coil disposed on the movable portion and corresponding to the fourth driving magnetic element.

In some embodiments, the first driving coil connects to the second driving coil in series. The third driving coil connects to the fourth driving coil in series. The first driving coil and the second driving coil connect to the third driving coil and the fourth driving coil in parallel.

In some embodiments, the fixed portion further includes a fifth side, a sixth side, a seventh side, and an eighth side. The fifth side is between the first side and the second side. The sixth side is between the second side and the third side. The seventh side is between the third side and the fourth side. The eighth side is between the fourth side and the first side. The first movable portion connecting portion, the second fixed portion connecting portion, and the second movable portion connecting portion are disposed on the fifth side. The third fixed portion connecting portion, the third movable portion connecting portion, the fourth fixed portion connecting portion, and the fourth movable portion connecting portion are disposed on the sixth side. The fifth fixed portion connecting portion, the fifth movable portion connecting portion, and the sixth movable portion connecting portion are disposed on the seventh side. The first fixed portion connecting portion and the sixth fixed portion connecting portion are disposed on the eighth side.

In some embodiments, the optical element driving mechanism further includes an adhesive element disposed on the first movable portion connecting portion, the first fixed portion connecting portion, the second movable portion connecting portion, the second fixed portion connecting portion, the third movable portion connecting portion, the third fixed portion connecting portion, the fourth movable portion connecting portion, the fourth fixed portion connecting portion, the fifth movable portion connecting portion, the fifth fixed portion connecting portion, the sixth movable portion connecting portion, and the sixth fixed portion connecting portion.

In some embodiments, the optical element driving mechanism further includes a circuit assembly surrounding the movable portion, a first conductive assembly embedded in the movable portion and including a first conductive portion, a second conductive portion, a third conductive portion, and a fourth conductive portion, and a second conductive assembly embedded in the base.

In some embodiments, the circuit assembly electrically connects to the first driving coil and the second driving coil via the third resilient unit and the first conductive portion. The circuit assembly electrically connects to the third driving coil and the fourth driving coil via the fourth resilient unit and the second conductive portion. The first driving coil and the second driving coil connect to the third driving coil and the fourth driving coil in parallel via the third conductive portion and the fourth conductive portion.

In some embodiments, the optical module electrically connects to the second conductive assembly via the first resilient unit, the second resilient unit, the fifth resilient unit, and the sixth resilient unit. The first conductive assembly is electrically insulated from the second conductive assembly. The third resilient unit and the fourth resilient unit are electrically insulated from the first resilient unit, the second resilient unit, the fifth resilient unit, and the sixth resilient unit.

In some embodiments, the second conductive assembly includes a first terminal, a second terminal, a third terminal, and a fourth terminal sequentially arranged on the first side. The first terminal electrically connects to the first resilient unit. The second terminal electrically connects to the sixth resilient unit. The third terminal electrically connects to the fifth resilient unit. The fourth terminal electrically connects to the second resilient unit.

In some embodiments, the first terminal, the second terminal, the third terminal, and the fourth terminal are in different heights in the first direction.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
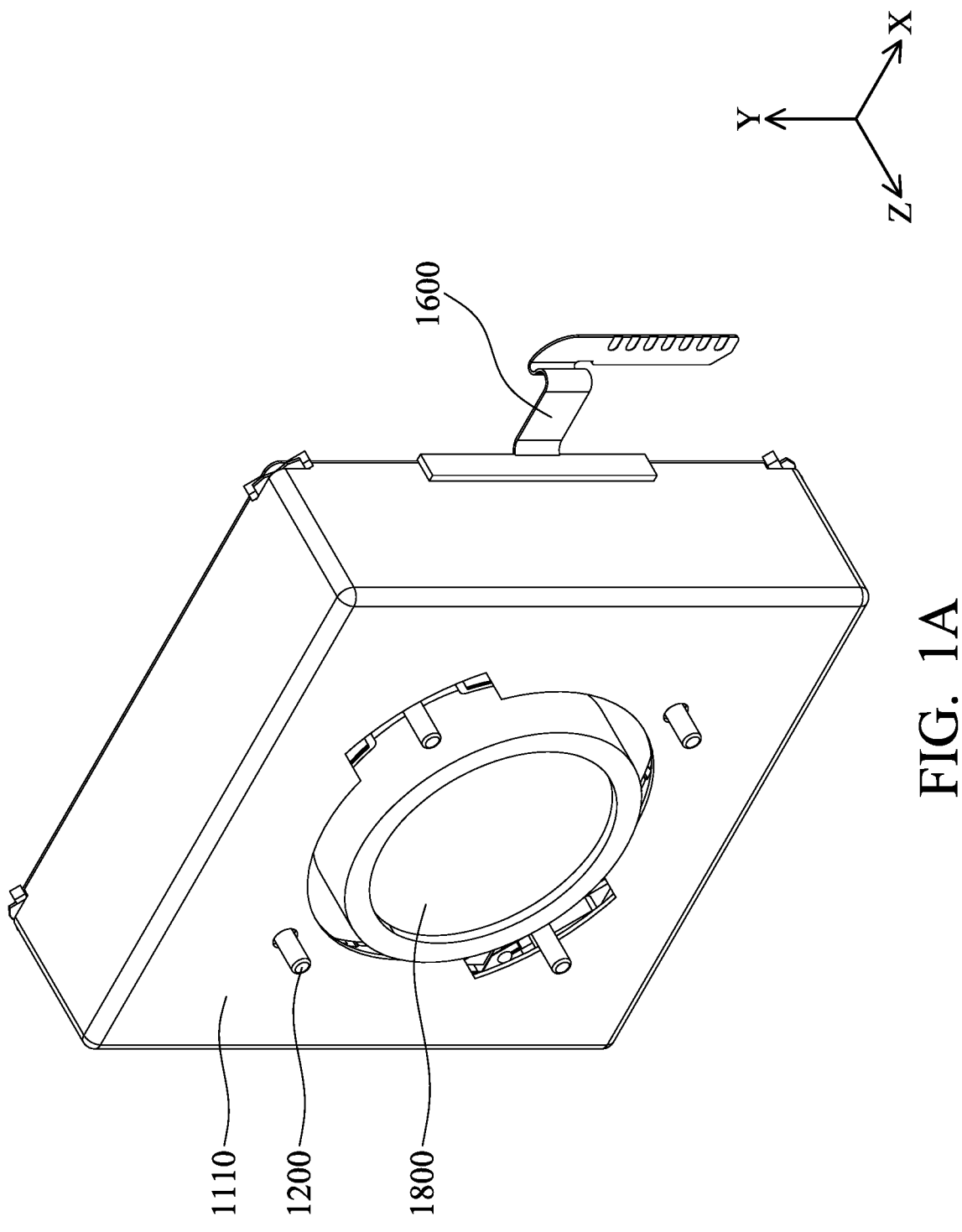
FIG. 1A is a schematic view of an optical element driving mechanism.

The following disclosure provides many different embodiments, or examples, for implementing different features of the provided subject matter. Specific examples of elements and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
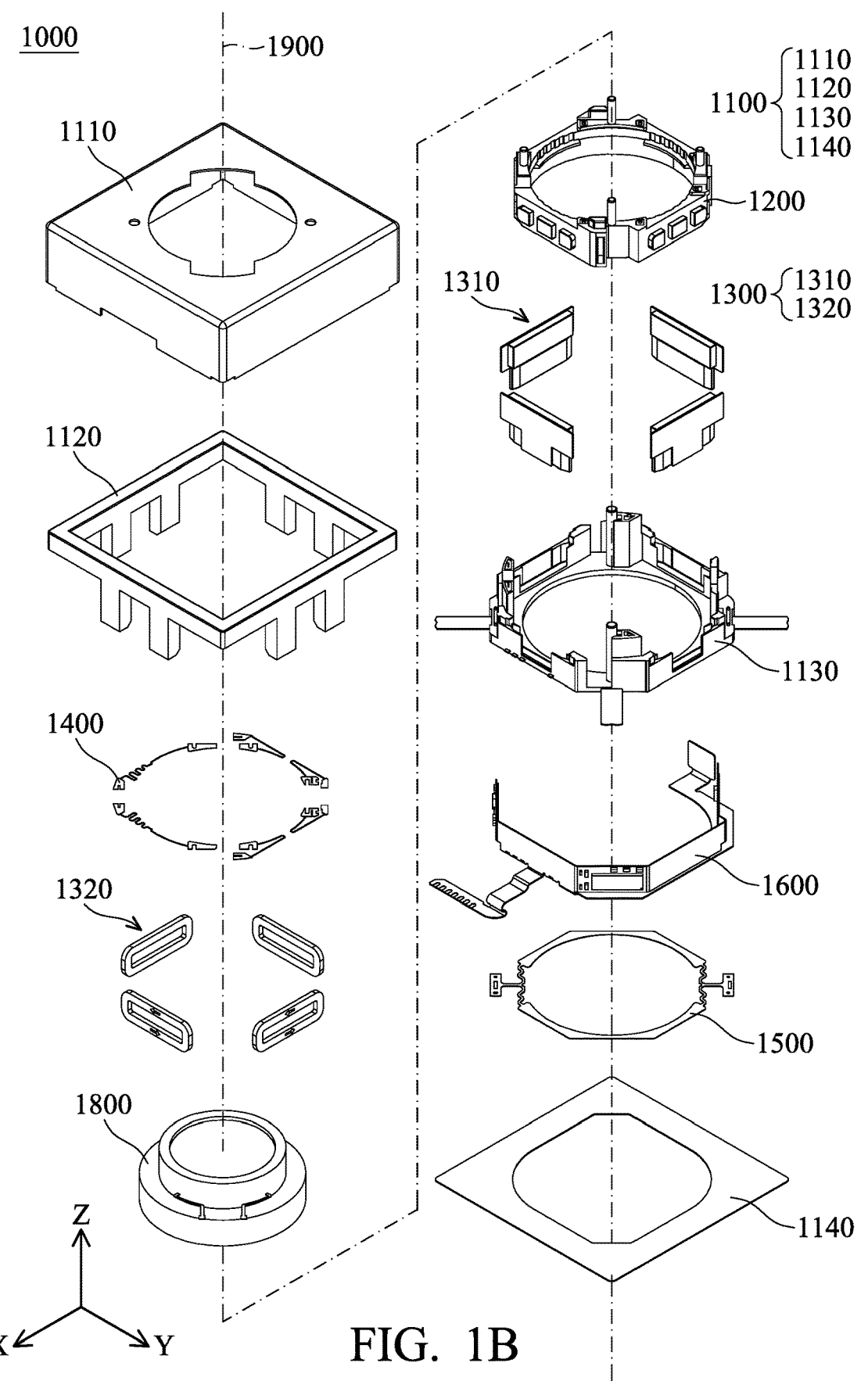
FIG. 1B is an exploded view of the optical element driving mechanism.
Figure 1C:
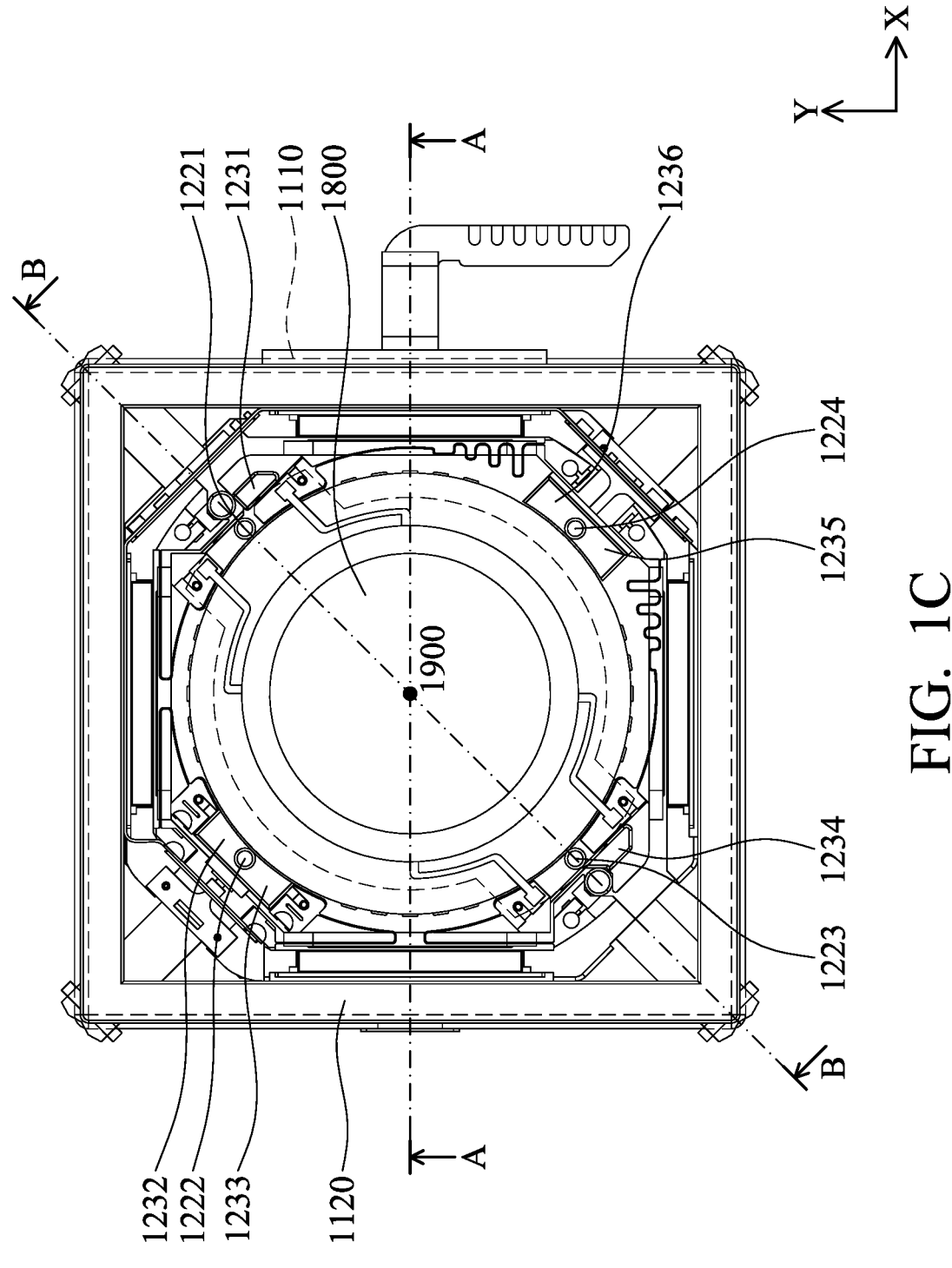
FIG. 1C is a top view of the optical element driving mechanism.
Figure 1D:
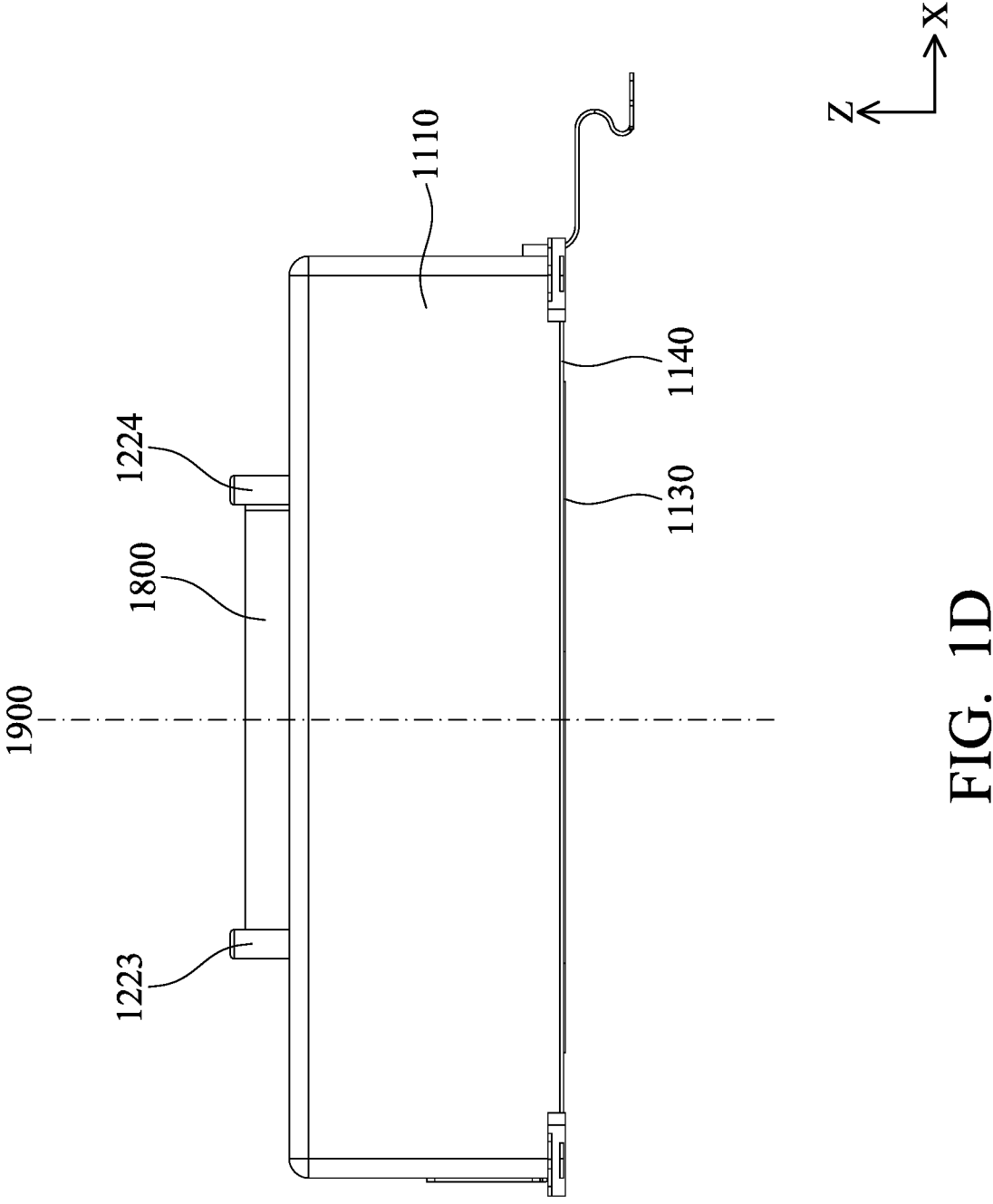
FIG. 1D is a side view of the optical element driving mechanism.
Figure 1E:
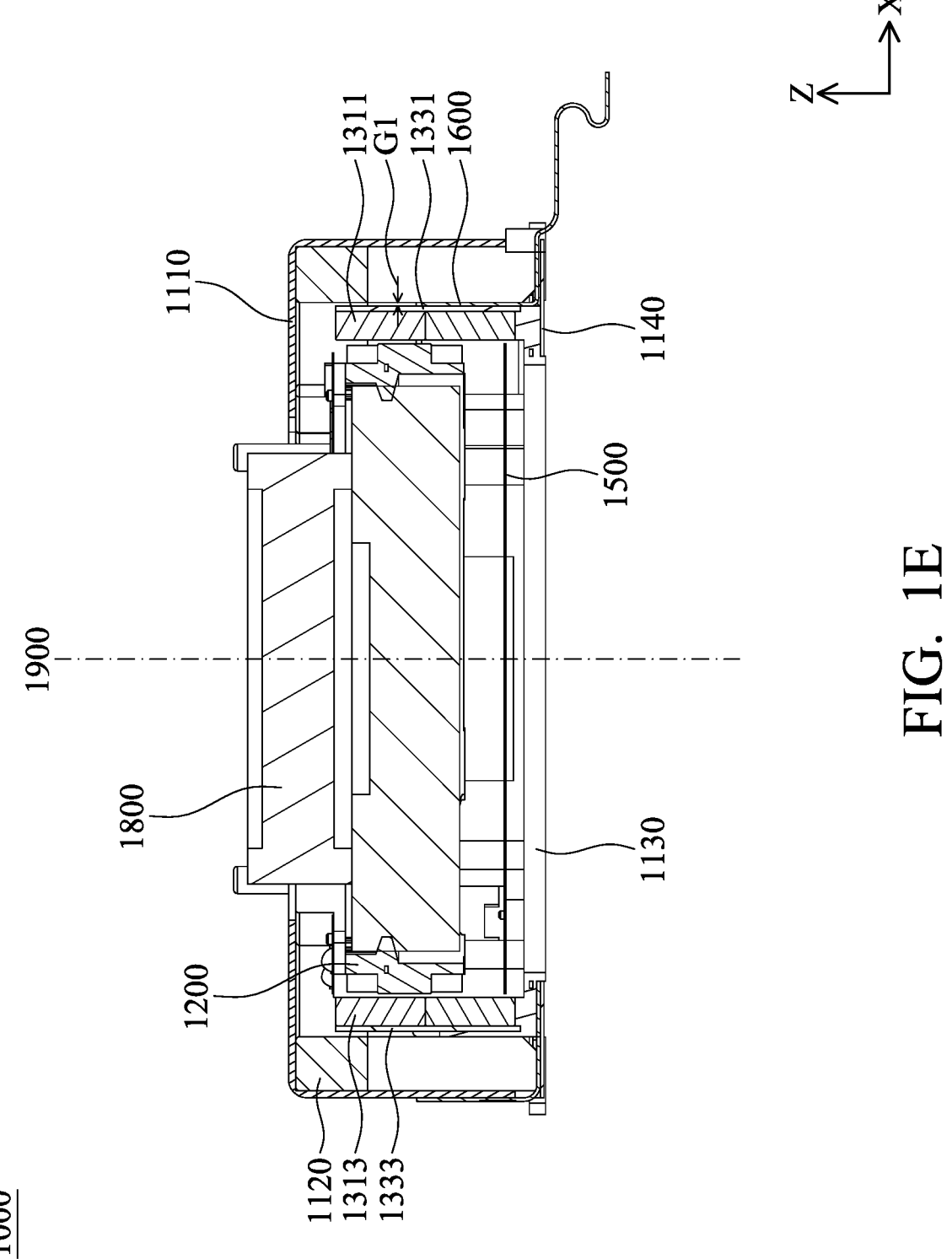
FIG. 1E is a cross-sectional view illustrated along line A-A in FIG. 1C.
Figure 1F:
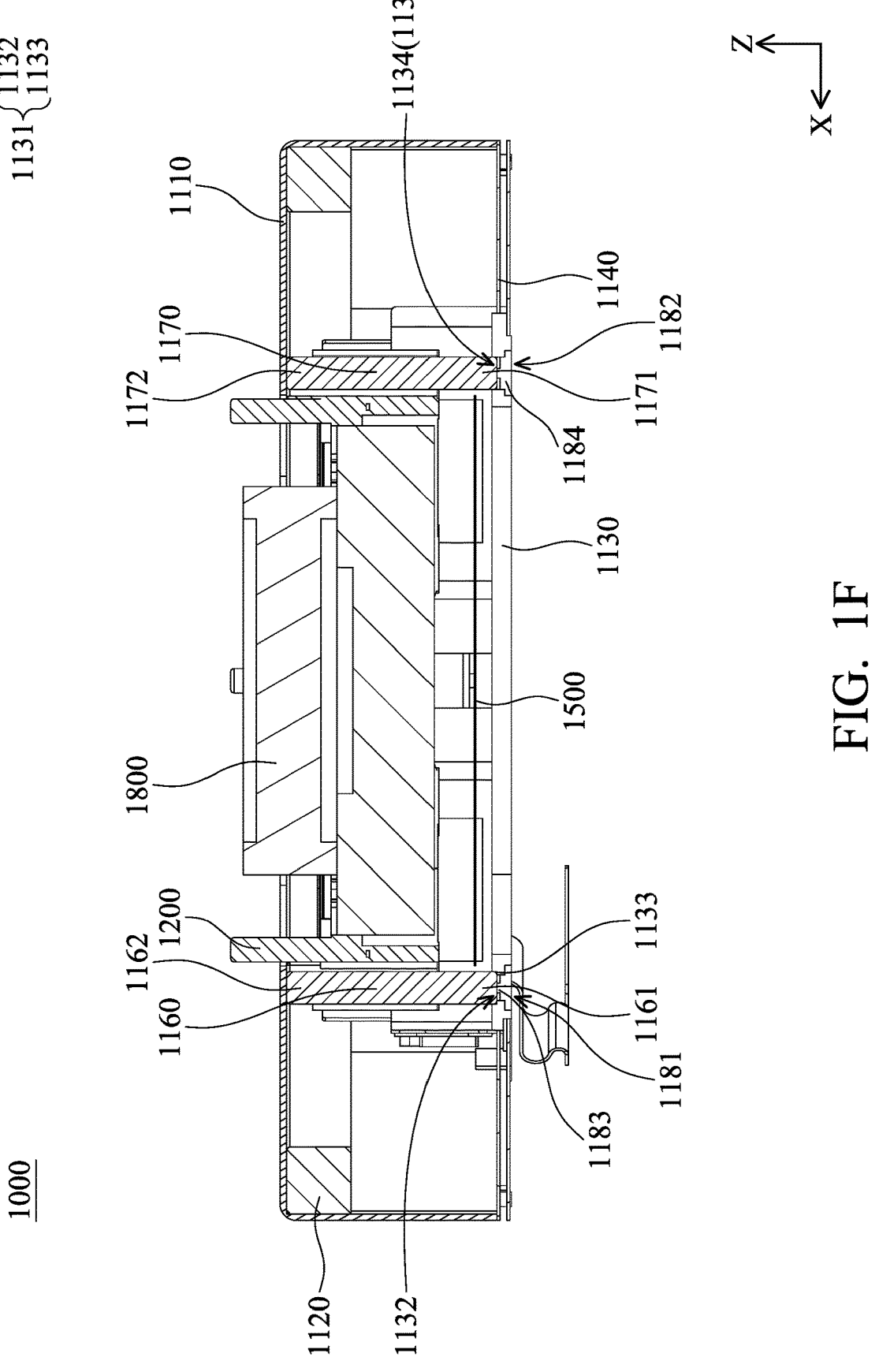
FIG. 1F is a cross-sectional view illustrated along line B-B in FIG. 1C.
Figure 1G:
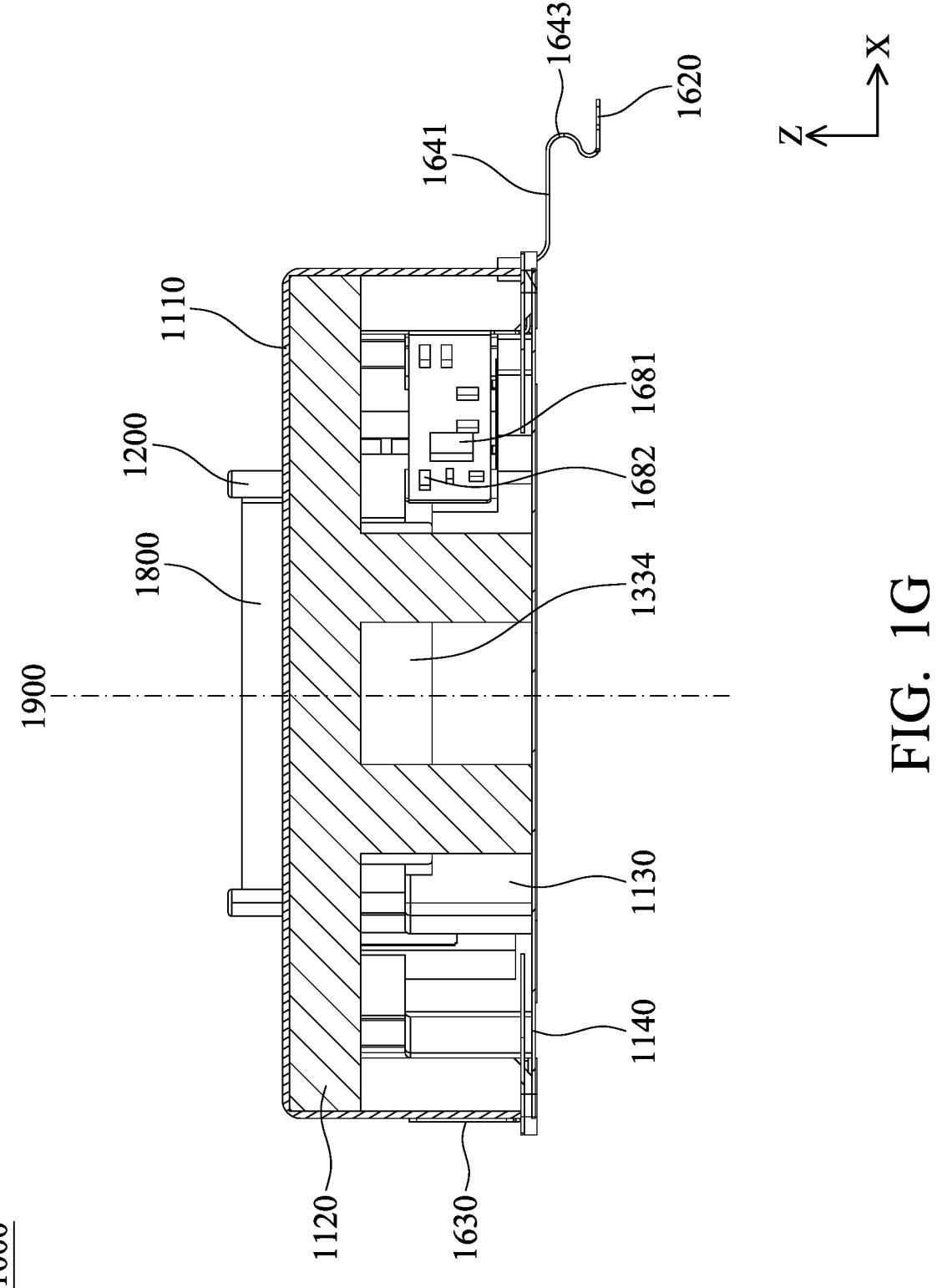
FIG. 1G is a perspective view of the optical element driving mechanism.

Embodiments of the present disclosure disclose an optical element driving mechanism used for driving an optical element to move. For example, FIG. 1A is a schematic view of an optical element driving mechanism 1000. FIG. 1B is an exploded view of the optical element driving mechanism 1000. FIG. 1C is a top view of the optical element driving mechanism 1000. FIG. 1D is a side view of the optical element driving mechanism 1000. FIG. 1E is a cross-sectional view illustrated along line A-A in FIG. 1C. FIG. 1F is a cross-sectional view illustrated along line B-B in FIG. 1C. FIG. 1G is a perspective view of the optical element driving mechanism 1000.

As shown in FIG. 1A to FIG. 1G, the optical element driving mechanism 1000 may mainly include a fixed portion 1100, a movable portion 1200, a driving assembly 1300, a first resilient element 1400, a second resilient element 1500, and a circuit assembly 1600 arranged along a main axis 1900. The optical element driving mechanism 1000 may be used for driving an optical element 1800 to move. In particular, the optical element 1800 may be disposed on the movable portion 1200, and the driving assembly 1300 may be used for driving the movable portion 1200 and the optical element 1800 to move together relative to the fixed portion 1100 to achieve auto focus (AF). The main axis 1900 may extend in a first direction (Z direction).

In some embodiments, the optical element 1800 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g., infrared or ultraviolet) are also included in the present disclosure.

In some embodiments, the fixed portion 1100 may include a case 1110, a frame 1120, a base 1130, and a bottom plate 1140 arranged along the main axis 1900. The case 1110 and the bottom plate 1140 may combine together to form a shell of the optical element driving mechanism 1000 for accommodating and protecting other elements. The frame 1120 and the base 1130 may be disposed between the case 1110 and the bottom plate 1140 to increase the structural strength of the optical element driving mechanism 1000. In some embodiments, the base 1130 may be polygonal when viewed along the main axis 1900.

In some embodiments, the driving assembly 1300 may include driving magnetic elements 1310 and driving coils 1320 disposed on the fixed portion 1100 and the movable portion 1200, respectively. Alternatively, their positions may be interchanged, depending on design requirement. When current passes through the driving coils 1320, the driving coils 1320 will interact with the magnetic field of the driving magnetic elements 1310 to generate an electromagnetic force to drive the movable portion 1200 and the optical element 1800 to move relative to the fixed portion 1100 to achieve auto focus. In some embodiments, the driving assembly 1300 may include other driving elements such as piezoelectric, shape memory alloy, etc.

In some embodiments, the first resilient element 1400 and the second resilient element 1500 may be disposed on opposite sides of the movable portion 1200. The first resilient element 1400 may be elastically connected to the fixed portion 1100 (e.g. the base 1130) and the movable portion 1200, and may be electrically connected to the driving coils 1320 and the circuit assembly 1600 to provide current to the driving coils 1320. The second resilient element 1500 may be disposed on the fixed portion 1100 (e.g. the base 1130), and the movable portion 1200 may be separated from the second resilient element 1500 or in contact with each other to control the position of the movable portion 1200, which will be described later.

In some embodiments, a first guiding rod 1160 and a second guiding rod 1170 disposed on the fixed portion 1100 may be used for movably connecting the movable portion 1200 and the fixed portion 1100. The first guiding rod 1160 includes a first guiding rod first end 1161 and a first guiding rod second end 1162 opposite to each other, the first guiding rod first end 1161 may be affixed on the base 1130, and the first guiding rod second end 1162 may be affixed on the case 1110. The second guiding rod 1170 includes a first end of second guiding rod 1171 and a second end of second guiding rod 1172 opposite to each other, the first end of second guiding rod 1171 may be affixed on the base 1130, and the second end of second guiding rod 1172 may be affixed on the case 1110. Therefore, the first guiding rod 1160 and the second guiding rod 1170 are allowed to be fixed on the fixed portion 1100.

In some embodiments, when viewed along the main axis 1900, the first guiding rod 1160 and the second guiding rod 1170 may be in direct contact with the movable portion 1200 to define the moving direction of the movable portion 1200 relative to the fixed portion 1100. The first guiding rod 1160 and the second guiding rod 1170 may include magnetic permeable materials.

In some embodiments, the way that the first guiding rod first end 1161 connecting to the base 1130 may be different from that of the first guiding rod second end 1162 connected to the case 1110, and the way that the first end of second guiding rod 1171 connecting to the base 1130 may be different from that of the second end of second guiding rod 1172 connected to the case 1110. For example, as shown in FIG. 1F, the first guiding rod first end 1161 and the first end of second guiding rod 1171 may be adhered to the case 1110 by glue. Moreover, the base 1130 may include a first connection opening 1181 and the second connection opening 1182. The first connection opening 1181 and the second connection opening 1182 allows laser to be provided to the first guiding rod second end 1162 and the second end of second guiding rod 1172 from the backside of the base 1130 (the side facing away from the case 1110) to heat the first guiding rod second end 1162 and the second end of second guiding rod 1172, and thus the first guiding rod 1160 and the second guiding rod 1170 may be connected to the first connection opening 1181 and the second connection opening 1182 by laser welding, respectively.

In some embodiments, a first adhesive element 1183 and a second adhesive element 1184 may be provided in the first connection opening 1181 and the second connection opening 1182, respectively, to connect the base 1130 to the first guiding rod 1160 and the second guiding rod 1170. In other words, in the first direction (Z direction), the first adhesive element 1183 and the first guiding rod 1160 at least partially overlap each other, the second adhesive element 1184 and the second guiding rod 1170 at least partially overlap each other, the first guiding rod 1160 does not expose from the first connection opening 1181, and the second guiding rod 1170 does not expose from the second connection opening 1182 to ensure the amounts of the first adhesive element 1183 and the second adhesive element 1184 are enough. Therefore, the base 1130 may be further affixed to the first guiding rod 1160 and the second guiding rod 1170.

Figure 2A:
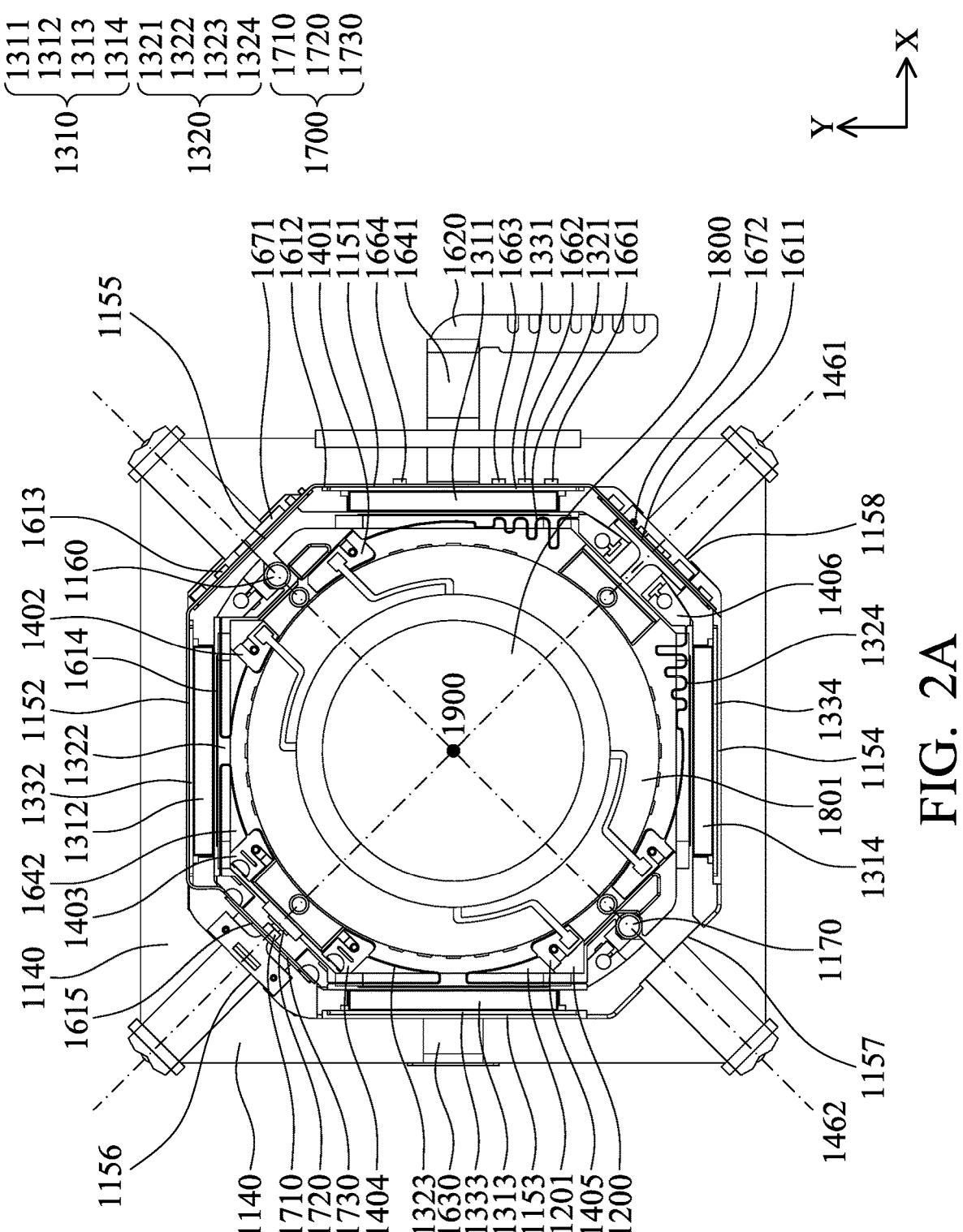
FIG. 2A is a top view of some elements of the optical element driving mechanism.
Figure 2B:
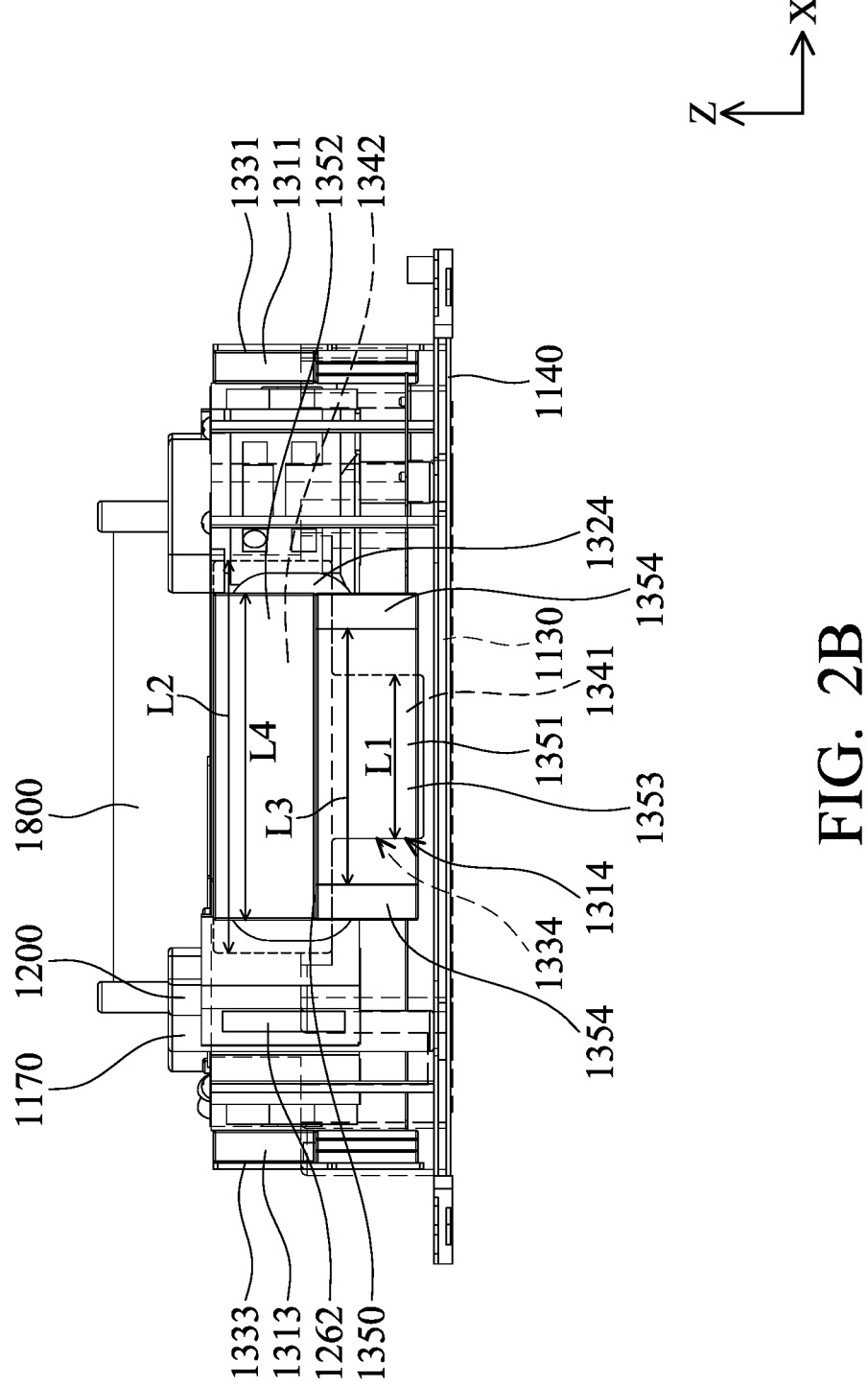
FIG. 2B is a perspective view of some elements of the optical element driving mechanism

FIG. 2A is a top view of some elements of the optical element driving mechanism 1000, FIG. 2B is a perspective view of some elements of the optical element driving mechanism 1000, wherein the case 1110 is omitted to show position relationship of other elements. As shown in FIG. 1F and FIG. 2A, the first guiding rod 1160 and the second guiding rod 1170 may extend in the Z direction, the movable portion 1200 may in contact with the first guiding rod 1160 and the second guiding rod 1170. The first guiding rod 1160 and the second guiding rod 1170 may be used for define the moving direction of the movable portion 1200, such as the movable portion 1200 may slide relative to the first guiding rod 1160 and the second guiding rod 1170 in the Z direction. To make the slide easier, a first lubricating coating and a second lubricating coating (e.g. Teflon) may be provided on the first guiding rod 1160 and the second guiding rod 1170, respectively. Moreover, additional lubricating element (e.g. lubricating oil) may be provided on the first guiding rod 1160 and the second guiding rod 1170 and in direct contact with the first lubricating coating and a second lubricating coating, to further allow the movable portion 1200 to slide relative to the first guiding rod 1160 and the second guiding rod 1170.

As shown in FIG. 2A, the base 1130 of the fixed portion 1100 may include a first edge 1151, a second edge 1152, a third edge 1153, a fourth edge 1154, a fifth edge 1155, a sixth edge 1156, a seventh edge 1157, and an eighth edge 1158. The first edge 1151 is opposite to the third edge 1153, the second edge 1152 is opposite to the fourth edge 1154, the fifth edge 1155 is opposite to the sixth edge 1156, and the seventh edge 1157 is opposite to the eighth edge 1158. The fifth edge 1155 is between the first edge 1151 and the second edge 1152, the sixth edge 1156 is between the second edge 1152 and the third edge 1153, the seventh edge 1157 is between the third edge 1153 and the fourth edge 1154, and the eighth edge 1158 is between the fourth edge 1154 and the first edge 1151. In some embodiments, the first guiding rod 1160 may position at the fifth edge 1155, and the second guiding rod 1170 may position at the seventh edge 1157. In other words, the first guiding rod 1160 and the second guiding rod 1170 may be disposed on opposite sides of the movable portion 1200.

In some embodiments, the driving magnetic elements 1310 may include a first driving magnetic element 1311, a second driving magnetic element 1312, a third driving magnetic element 1313, and a fourth driving magnetic element 1314 disposed on the first edge 1151, the second edge 1152, the third edge 1153, and the fourth edge 1154, respectively. The driving coils 1320 may include a first driving coil 1321, a second driving coil 1322, a third driving coil 1323, and a fourth driving coil 1324 disposed on the movable portion 1200 and corresponding to the first driving magnetic element 1311, the second driving magnetic element 1312, the third driving magnetic element 1313, and the fourth driving magnetic element 1314, respectively. Furthermore, in some embodiments, a first magnetic permeable element 1331, a second magnetic permeable element 1332, a third magnetic permeable element 1333, and a fourth magnetic permeable element 1334 may be disposed on the base 1130 and they correspond to the first driving magnetic element 1311, the second driving magnetic element 1312, the third driving magnetic element 1313, and the fourth driving magnetic element 1314, respectively.

In some embodiments, the first driving magnetic element 1311, the second driving magnetic element 1312, the third driving magnetic element 1313, and the fourth driving magnetic element 1314 may have similar structures. Taking the fourth driving magnetic element 1314 as an example, the fourth driving magnetic element 1314 may include a first driving magnetic unit 1351 and a second driving magnetic unit 1352 arranged in the first direction. In some embodiments, when viewed in a second direction (e.g., Y direction), as shown in FIG. 2B, the first driving magnetic unit 1351 and the fourth driving coil 1324 at least partially expose from the fourth magnetic permeable element 1334, and the second driving magnetic unit 1352 does not expose from the fourth magnetic permeable element 1334. Moreover, as shown in FIG. 1E, when viewed in the second direction, a gap G1 greater than zero is between the first magnetic permeable element 1331 and the case 1110 in a third direction (e.g., X direction), and the second magnetic permeable element 1332, the third magnetic permeable element 1333, and the fourth magnetic permeable element 1334 may have gaps greater than zero to the case 1110 as well.

Figure 3A:
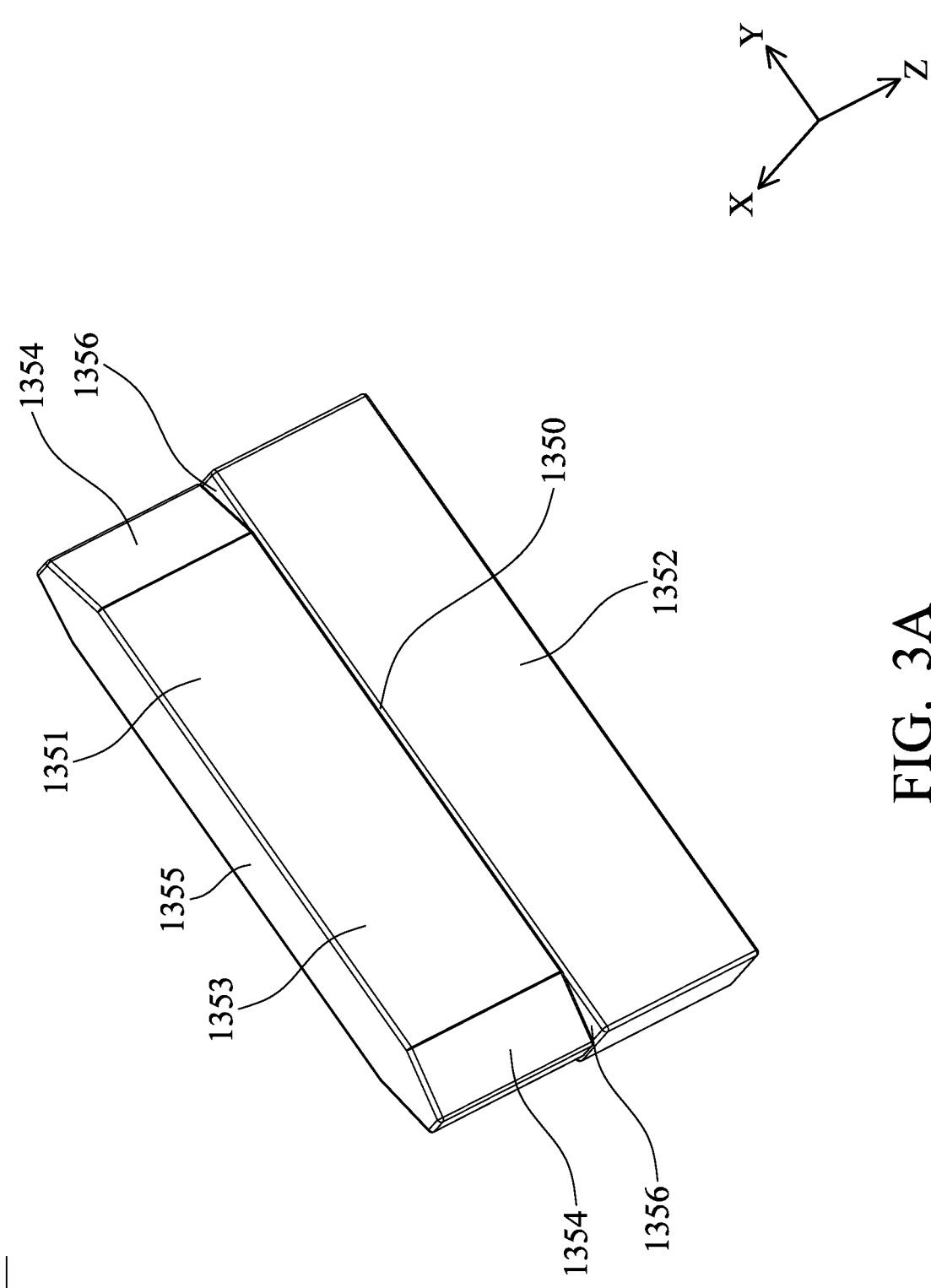
FIG. 3A is a schematic view of the driving magnetic elements.
Figure 3B:
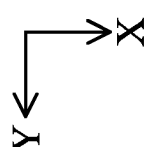
FIG. 3B is a top view of the driving magnetic elements.
Figure 3B:
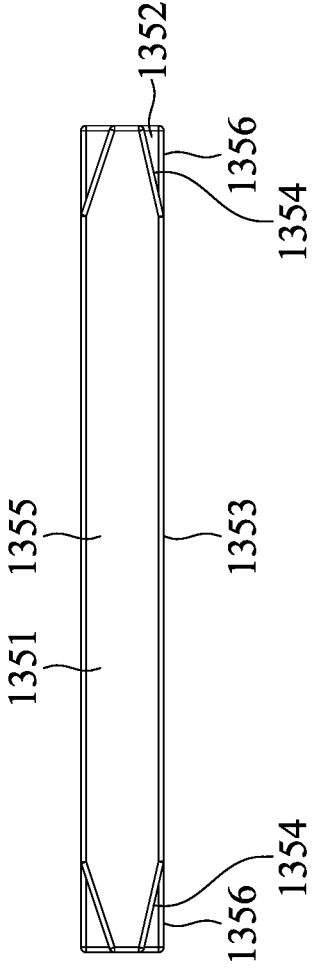

FIG. 3A is a schematic view of the driving magnetic elements 1310. FIG. 3B is a top view of the driving magnetic elements 1310. In some embodiments, the first driving magnetic unit 1351 includes a first side surface 1353, a second side surface 1354, and a first lower surface 1355. The second driving magnetic unit 1352 includes a second lower surface 1356, wherein the second side surface 1354 is adjacent to the second lower surface 1356, and the first side surface 1353 and the second side surface 1354 are not perpendicular or parallel to each other. The first side surface 1353 connects to the second side surface 1354. In some embodiments, as shown in FIG. 2B, when viewed in the second direction, at least a portion of the fourth magnetic permeable element 1334 overlaps the first side surface 1353, and the first side surface 1353 and the second side surface 1354 at least partially expose from the fourth magnetic permeable element 1334. In some embodiments, the first lower surface 1355 and the second lower surface 1356 face an identical direction (e.g., −Z direction). When viewed in the first direction, the second lower surface 1356 at least partially expose from the first driving magnetic unit 1351, wherein the first driving magnetic unit 1351 is polygonal, and the second driving magnetic unit 1352 is rectangular. Since the first driving magnetic unit 1351 is polygonal, the required space may be reduced to achieve miniaturization.

Moreover, the second driving magnetic unit 1352 is rectangular, which is bigger than the first driving magnetic unit 1351, higher magnetic force may be provided to improve the performance of the optical element driving mechanism 1000.

In some embodiments, the first magnetic permeable element 1331, the second magnetic permeable element 1332, the third magnetic permeable element 1333, and the fourth magnetic permeable element 1334 may have similar structures. Taking the fourth magnetic permeable element 1334 as an example, as shown in FIG. 2B, the fourth magnetic permeable element 1334 may include a first guiding magnetic unit 1341 and a second guiding magnetic unit 1342 connect with each other. In the third direction, the first guiding magnetic unit 1341 has a first length L1, the second guiding magnetic unit 1342 has a second length L2, and the first length L1 is less than the second length L2. In some embodiments, the first guiding magnetic unit 1341 may at least partially overlap the first driving magnetic unit 1351, and the second guiding magnetic unit 1342 may at least partially overlap the first driving magnetic unit 1351 and the second driving magnetic unit 1352 for magnetic conduction. In some embodiments, in the third direction, the first side surface 1353 has a third length L3, the second driving magnetic unit 1352 has a fourth length L4, and L2>L4>L3>L1.

Figure 4A:
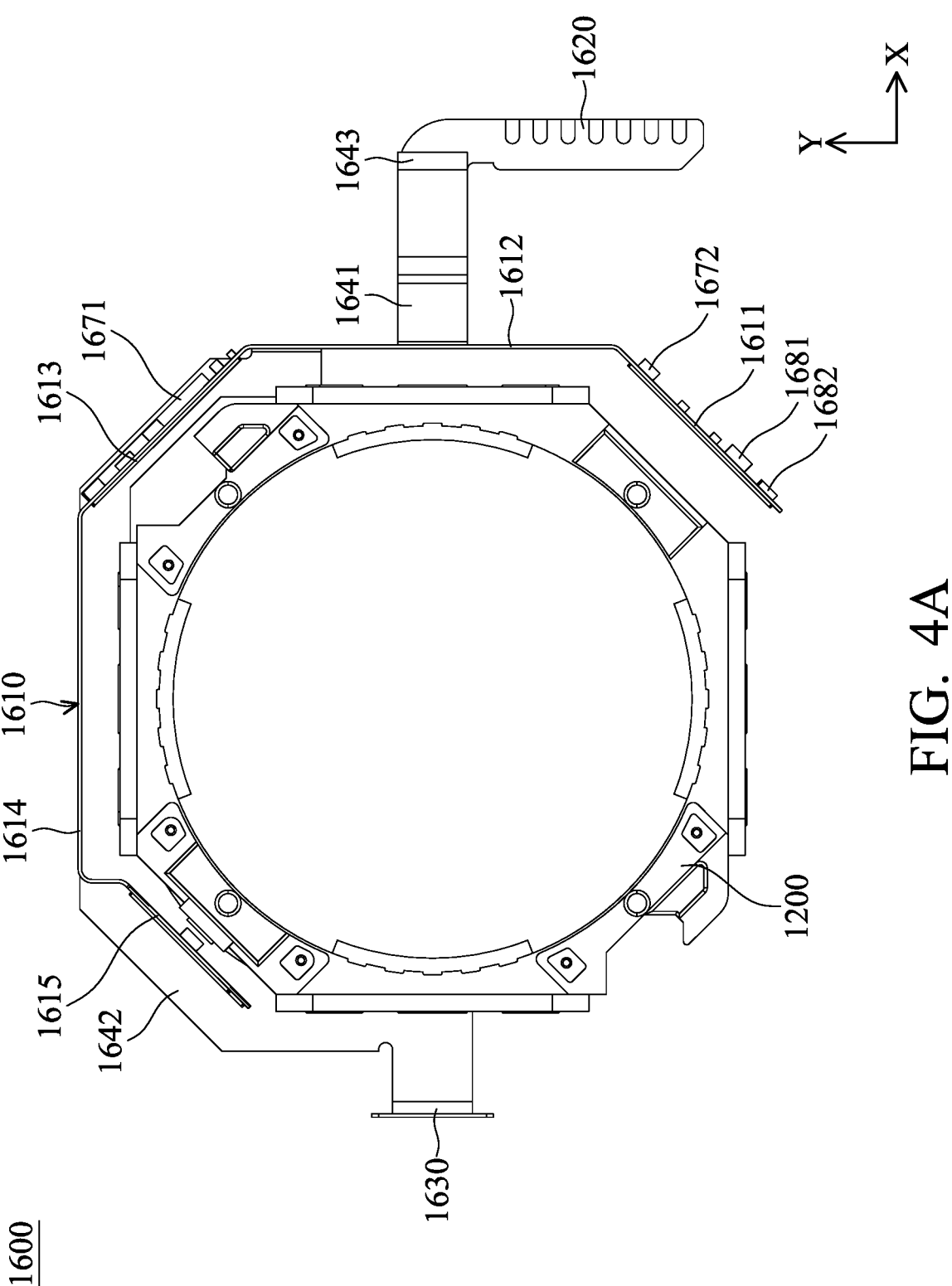
FIG. 4A is a top view of the circuit assembly.
Figure 4B:
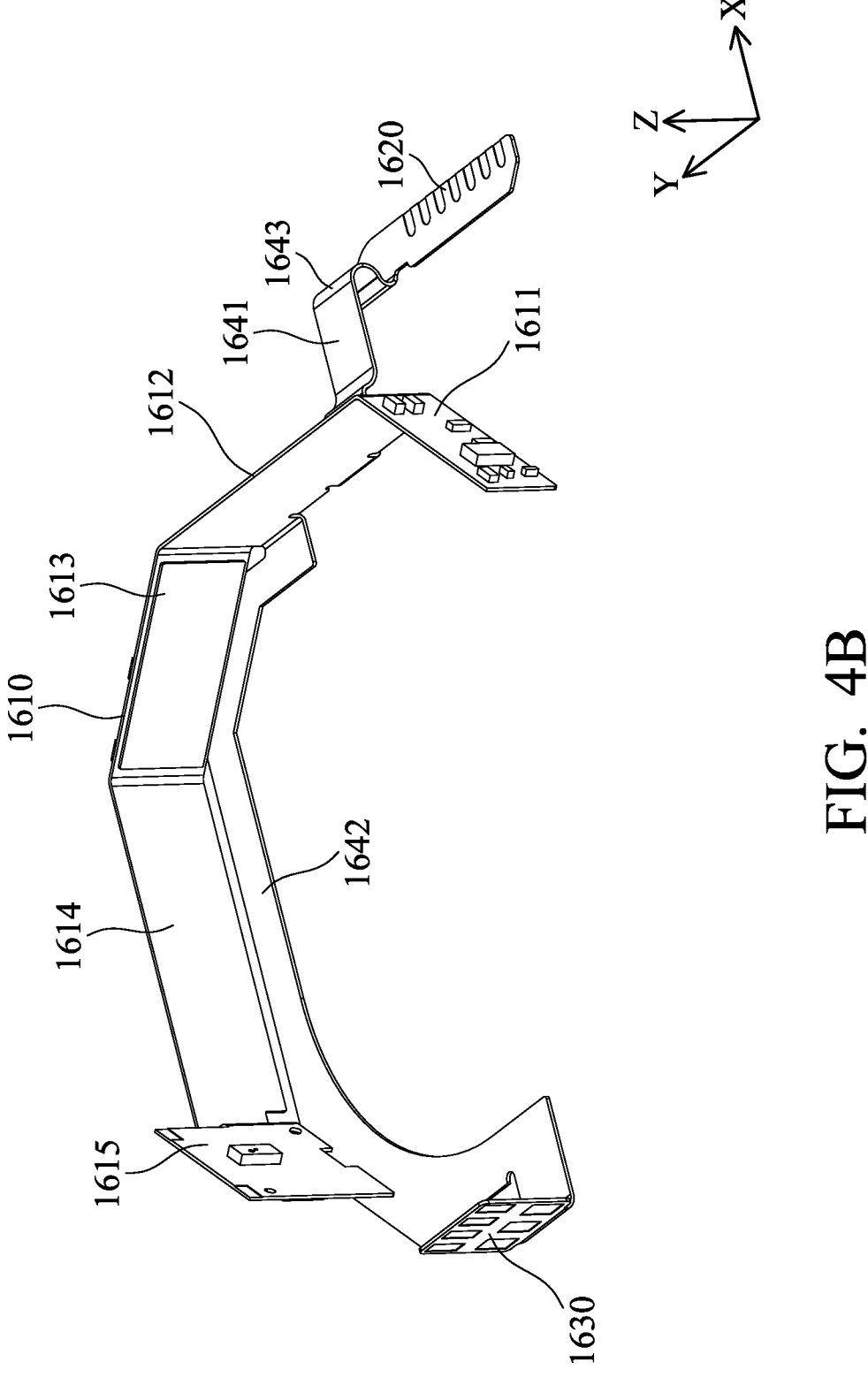
FIG. 4B is a schematic view of the circuit assembly.
Figure 4C:
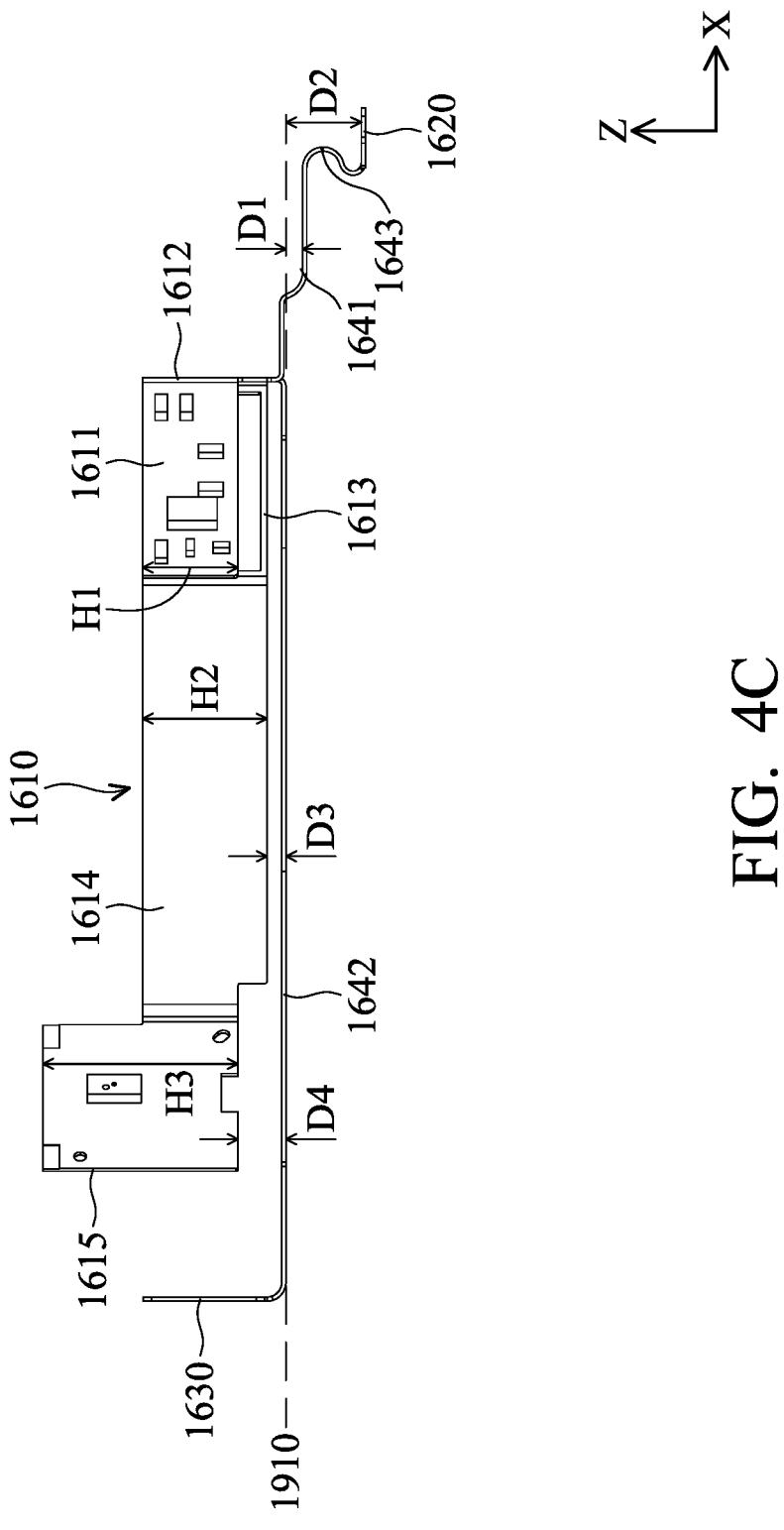
FIG. 4C is a side view of the circuit assembly.

FIG. 4A is a top view of the circuit assembly 1600. FIG. 4B is a schematic view of the circuit assembly 1600. FIG. 4C is a side view of the circuit assembly 1600. The circuit assembly 1600 may be disposed on the fixed portion 1100, and may include a surrounding portion 1610, a first circuit connecting portion 1620, a second circuit connecting portion 1630, a first extending portion 1641, a second extending portion 1642, and a resilient connecting portion 1643. The surrounding portion 1610 may surround the movable portion 1200 and the main axis 1900, and may include a first segment 1611, a second segment 1612, a third segment 1613, a fourth segment 1614, and a fifth segment 1615 sequentially connected to each other. In some embodiments, the first magnetic permeable element 1331, the second magnetic permeable element 1332, the third magnetic permeable element 1333, and the fourth magnetic permeable element 1334 may be disposed on the circuit assembly 1600. When viewed along the main axis 1900, the surrounding portion 1610 and the second extending portion 1642 may at least partially overlap each other, the first extending portion 1641 and the second extending portion 1642 may not overlap each other, the base 1130 and the circuit assembly 1600 may at least partially overlap each other, the movable portion 1200 and the second extending portion 1642 may at least partially overlap each other and does not overlap the surrounding portion 1610.

As shown in FIG. 2A, the first segment 1611 is at the eighth edge 1158, the second segment 1612 is at the first edge 1151, the third segment 1613 is at the fifth edge 1155, the fourth segment 1614 is at the second edge 1152, and the fifth segment 1615 is at the sixth edge 1156. The first extending portion 1641 is at the first edge 1151 and extends from the surrounding portion 1610 in the second direction. In other words, the circuit assembly 1600 does not dispose on the fourth edge 1154. The second extending portion 1642 may connect to the second segment 1612 and be between the base 1130 and the bottom plate 1140. The resilient connecting portion 1643 may connect to the first extending portion 1641, and the first circuit connecting portion 1620 may connect to the resilient connecting portion 1643 and extend in the third direction. The second circuit connecting portion 1630 may connect to the second extending portion 1642 and extend in the first direction.

In some embodiments, a normal direction of the second extending portion 1642 is parallel to the first direction. Normal directions of the first segment 1611, the second segment 1612, the third segment 1613, the fourth segment 1614, and the fifth segment 1615 are perpendicular to the first direction, and the resilient connecting portion 1643 and the fixed portion 1100 are separated from each other. Furthermore, in some embodiments, the first magnetic permeable element 1331 and the third magnetic permeable element 1333 at least partially overlap the circuit assembly 1600 in the third direction. The second magnetic permeable element 1332 at least partially overlaps the circuit assembly 1600 in the second direction. Moreover, when viewed in the second direction, as shown in FIG. 1G, the fourth magnetic permeable element 1334 is exposed from the circuit assembly 1600 and separated from the circuit assembly 1600. In some embodiments, an insulating element (not shown) may be disposed between the circuit assembly 1600 and the case 1110, such as glue, to connect the circuit assembly 1600 and the case 1110 and prevent short circuit.

In some embodiments, as shown in FIG. 2A and FIG. 4A, the circuit assembly 1600 may further include a first electronic element 1671 and a second electronic element 1672 disposed on the surrounding portion 1610 and between the surrounding portion 1610 and the case 1110, and respectively disposed on the fifth edge 1155 and the eighth edge 1158.

In some embodiments, as shown in FIG. 4C, a bottom surface of the second extending portion 1642 coincides a virtual plane 1910. The first extending portion 1641 and the surrounding portion 1610 are at opposite sides of the virtual plane 1910. In the first direction, a first distance D1 is between the first extending portion 1641 and the virtual plane 1910, a second distance D2 is between the first circuit connecting portion 1620 and the virtual plane 1910, a third distance D3 is between the fourth segment 1614 and the virtual plane 1910, a fourth distance D4 is between the fifth segment 1615 and the virtual plane 1910, and D2>D4>D3>D1. In some embodiments, the third distance D3 may be less than the first distance D1, depending on design requirement. In some embodiments, in the first direction, the first segment 1611 has a first height H1, the fourth segment 1614 has a second height H2, the fifth segment 1615 has a third height H3, and H1<H2<H3. In some embodiments, when viewed in the second direction, the first segment 1611 at least partially overlaps the third segment 1613. Moreover, when viewed in the second direction, the first segment 1611 at least partially exposed from the third segment 1613, and the second extending portion 1642 does not overlap the surrounding portion 1610 to achieve miniaturization.

Figure 5A:
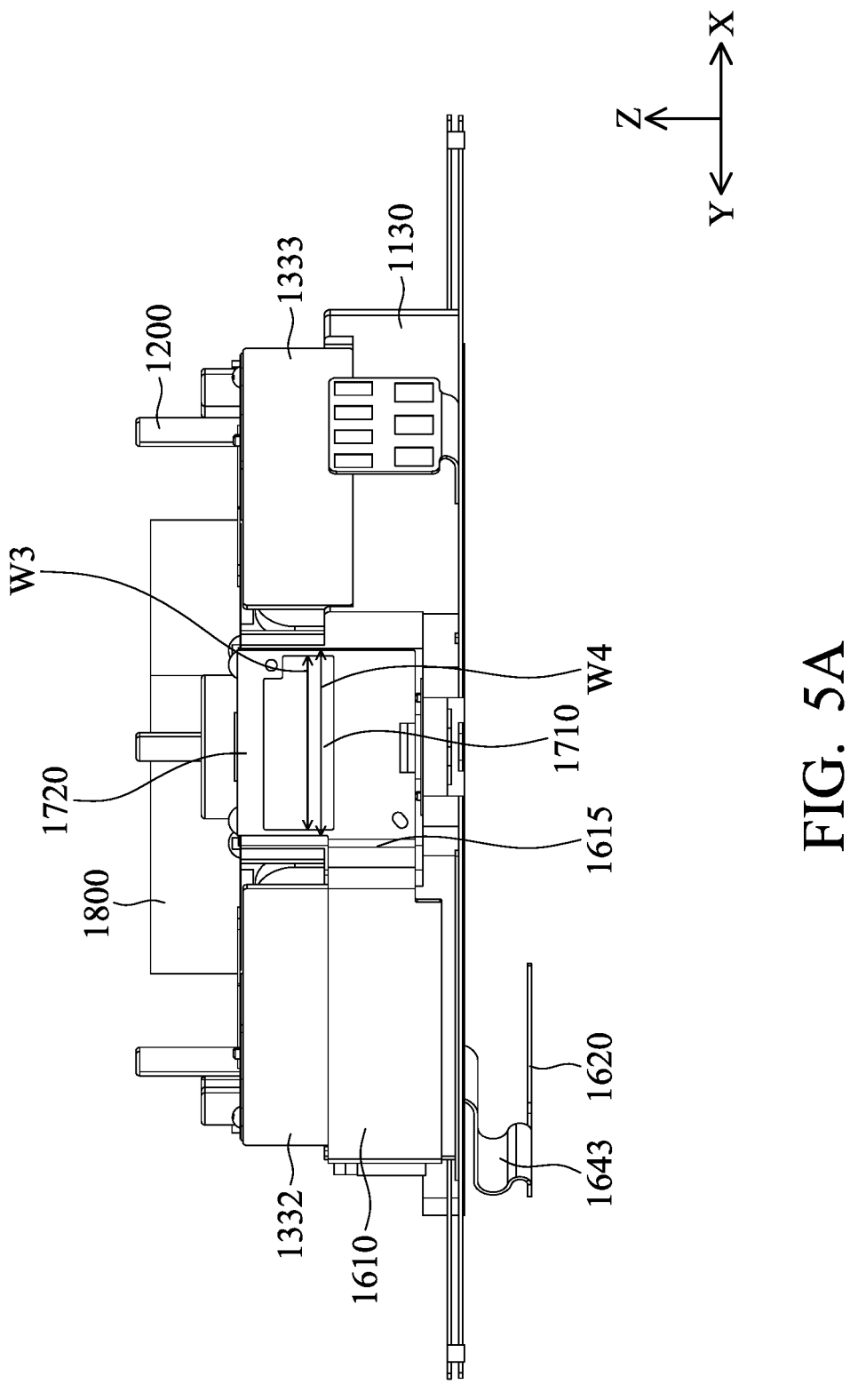
FIG. 5A is a schematic view of some elements of the optical element driving mechanism.
Figure 5B:
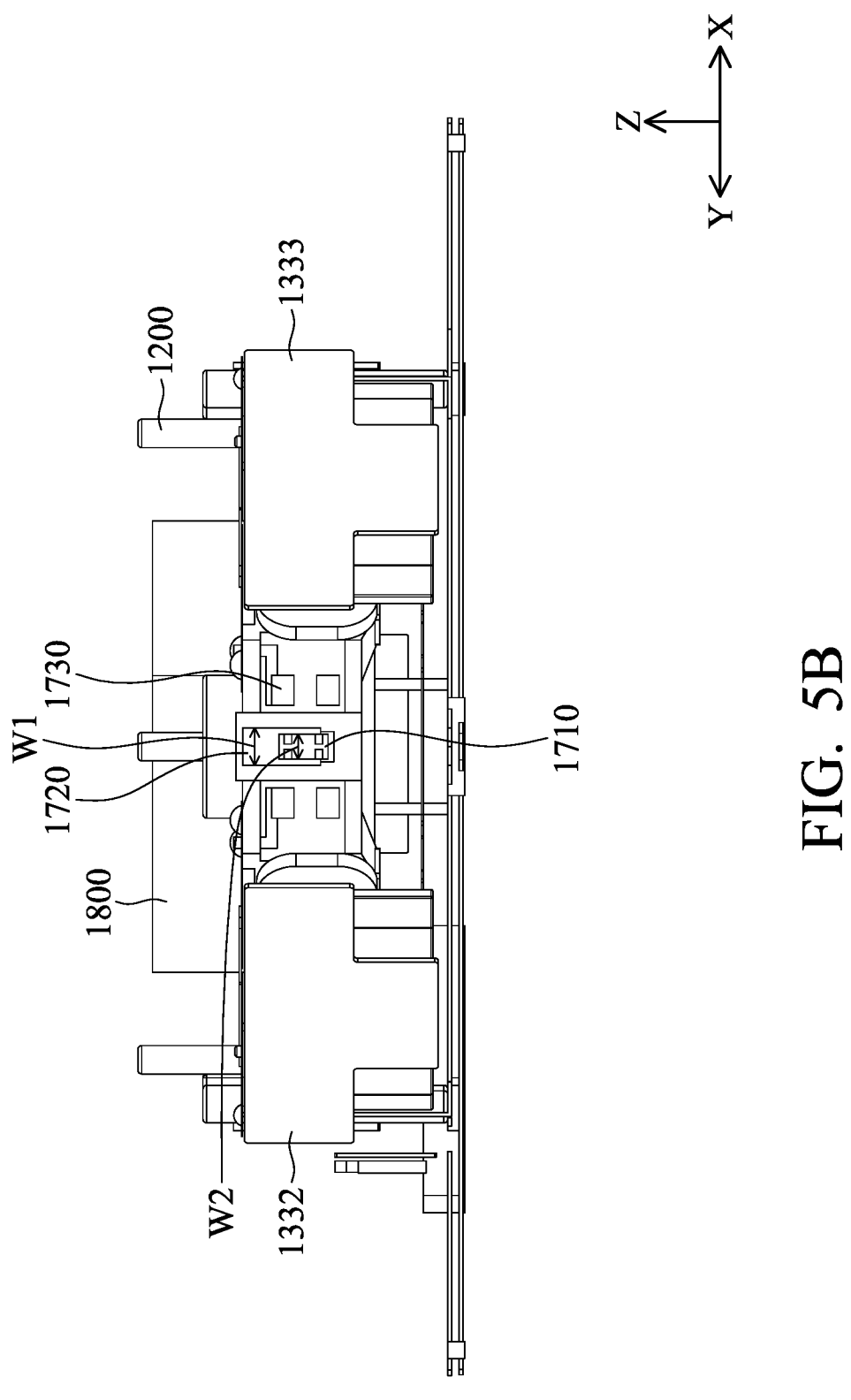
FIG. 5B is a schematic view of some elements of the optical element driving mechanism.

FIG. 5A and FIG. 5B are schematic views of some elements of the optical element driving mechanism 1000. As shown in FIG. 2A, FIG. 5A, and FIG. 5B, the optical element driving mechanism 1000 may further include a sensing assembly 1700 disposed on the sixth edge 1156 and including a position sensing element 1710, a sensing magnetic element 1720, and a reinforcement element 1730. In some embodiments, the sensing assembly 1700 and the second extending portion 1642 may at least partially overlap each other when viewed along the main axis 1900.

In some embodiments, the position sensing element 1710 may include a Hall sensor, a magnetoresistance effect sensor (MR sensor), a giant magnetoresistance effect sensor (GMR sensor), a tunneling magnetoresistance effect sensor (TMR sensor), or a fluxgate sensor. The position sensing element 1710 may detect the magnetic field generated from the sensing magnetic element 1720, and the position sensing element 1710 and the sensing magnetic element 1720 may be disposed on the fixed portion 1100 (or the circuit assembly 1600) and the movable portion 1200, respectively, or their positions may be interchanged. Therefore, the position of the movable portion 1200 relative to the fixed portion 1100 (or to the circuit assembly 1600) may be detected by the sensing assembly 1700. In some embodiments, the first electronic element 1671 and the sensing assembly 1700 may be disposed on opposite sides of the movable portion 1200 to prevent interference. In some embodiments, the first electronic element 1671 may include multiple connection pins, and at least half of the connection pins do not electrically connect to the circuit assembly 1600.

In some embodiments, the reinforcement element 1730 may be disposed on the fixed portion 1100 or the circuit assembly 1600, such as may be disposed on the fifth segment 1615 of the surrounding portion 1610, the circuit assembly 1600 may be between the reinforcement element 1730 and the position sensing element 1710, and the sensing magnetic element 1720 and the reinforcement element 1730 may be disposed on opposite sides of the position sensing element 1710. In some embodiments, the material of the reinforcement element 1730 may include nonmagnetic permeable metal to provide structural strength.

As shown in FIG. 5B, when viewed in a fourth direction perpendicular to the fifth segment 1615 (parallel to the normal direction of the fifth segment 1615), the reinforcement element 1730 at least partially overlaps the position sensing element 1710 and the sensing magnetic element 1720, the sensing magnetic element 1720 is at least partially exposed from the reinforcement element 1730, the fifth segment 1615 at least partially overlaps the position sensing element 1710, the sensing magnetic element 1720, and the reinforcement element 1730, and the resilient connecting portion 1643 and the base 1130 at least partially overlap each other. The fourth direction is perpendicular to the first direction. Moreover, the sensing magnetic element 1720 has a width W1, the position sensing element 1710 has a width W2, the reinforcement element 1730 has a width W3, and the fifth segment 1615 has a width W4, and W4>W3>W1>W2. In some embodiments, when viewed in the fourth direction, the circuit assembly 1600 at least partially overlaps the second magnetic permeable element 1332 and the third magnetic permeable element 1333, and the second magnetic permeable element 1332 and the third magnetic permeable element 1333 do not overlap the sensing assembly 1700 to achieve miniaturization.

Figure 5C:
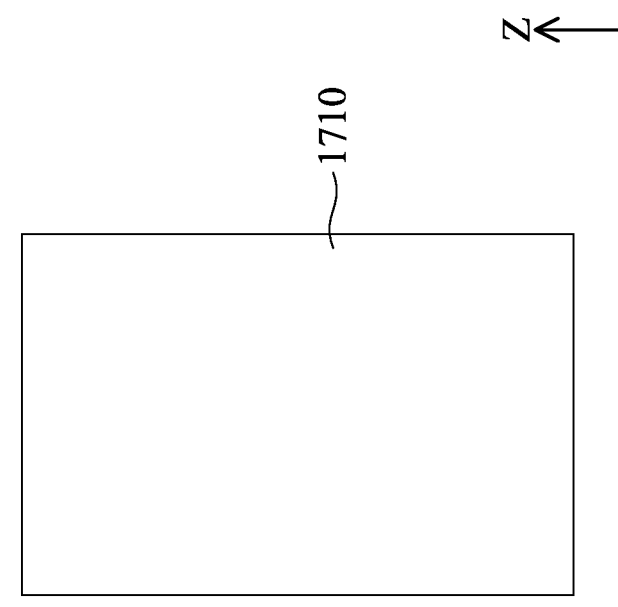
FIG. 5C is a schematic view of the position sensing element and the sensing magnetic element.

FIG. 5C is a schematic view of the position sensing element 1710 and the sensing magnetic element 1720. In some embodiments, the position sensing element 1710 may include a plurality of first sensing magnetic units 1711 and second sensing magnetic units 1712 arranged alternatively in the first direction, and the first sensing magnetic units 1711 and the second sensing magnetic units 1712 have opposite pole directions. Therefore, when relative movement in the Z direction occurs between the position sensing element 1710 and the sensing magnetic element 1720, the position sensing element 1710 may detect the magnetic field variation caused by the first sensing magnetic units 1711 and the second sensing magnetic units 1712 of the sensing magnetic element 1720 to get the position of the movable portion 1200 relative to the fixed portion 1100.

In some embodiments, as shown in FIG. 4A, the optical element driving mechanism 1000 may further include a storage unit 1681 and a processing unit 1682 disposed on the fixed portion 1100 or the circuit assembly 1600. In some embodiments, the storage unit 1681 may include storage devices such as memory (e.g., dynamic random access memory (DRAM) device, static random access memory (SRAM) device, high bandwidth memory (HBM) device, etc.). In some embodiments, the processing unit 1682 may include process units such as logic device (e.g., central processing units (CPUs), graphics processing unit (GPUs), system-on-chips (SoCs), application processors (APs), micro controllers, application-specific integrated circuit (ASIC), etc.

In some embodiments, the processing unit 1682 may be configured to determine the position of the movable portion 1200 relative to the fixed portion 1100 according to the calibration information stored in the storage unit 1681. In some embodiments, since the elements of the optical element driving mechanism 1000 may have tolerances during manufacture, the calibration information of the optical element driving mechanism 1000 may be obtained through the following steps. First, move the movable portion 1200 from an initial position to a final position, such as move the entire stroke in the Z direction. Next, the magnetic field of the sensing magnetic element 1720 is sensed by the position sensing element 1710 to obtain first position information, and the first position information includes magnetic field values at different positions. Next, the first position information is analyzed to obtain calibration information.

In some embodiments, the operation of analyzing first position information may include differentiating the first position information to obtain second position information. Then, based on the number of positive and negative changes in the second position information, the number of sensing magnetic elements passing through the first sensing magnetic units 1711 and the second sensing magnetic units 1712 is determined, and the position interval information is obtained based on this number. Based on the position interval information and the magnetic field sensed by the position sensing element, the detailed position of the movable portion 1200 relative to the fixed portion 1100 is determined. For example, if the positive and negative values change once, it represents passing through one first sensing magnetic unit 1711 and one second sensing magnetic unit 1712, thus the relative distance of movement between the sensing magnetic element 1720 and the position sensing element 1710 may be determined. Finally, calibration information may be obtained through the detailed position of the movable portion 1200 relative to the fixed portion 1100, the position interval information, and the magnetic field.

Figure 6A:
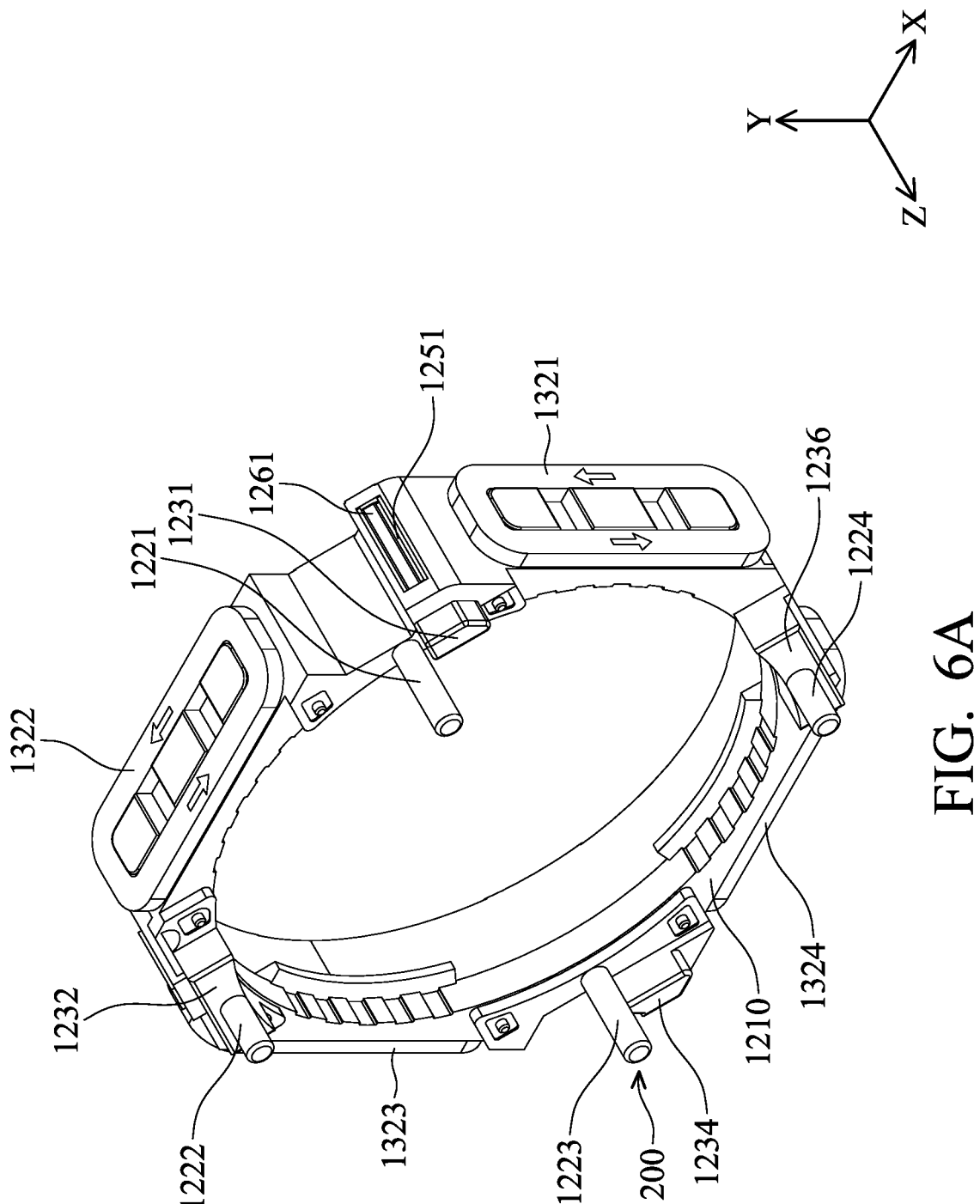
FIG. 6A is a schematic view of the movable portion and the driving coils.
Figure 6B:
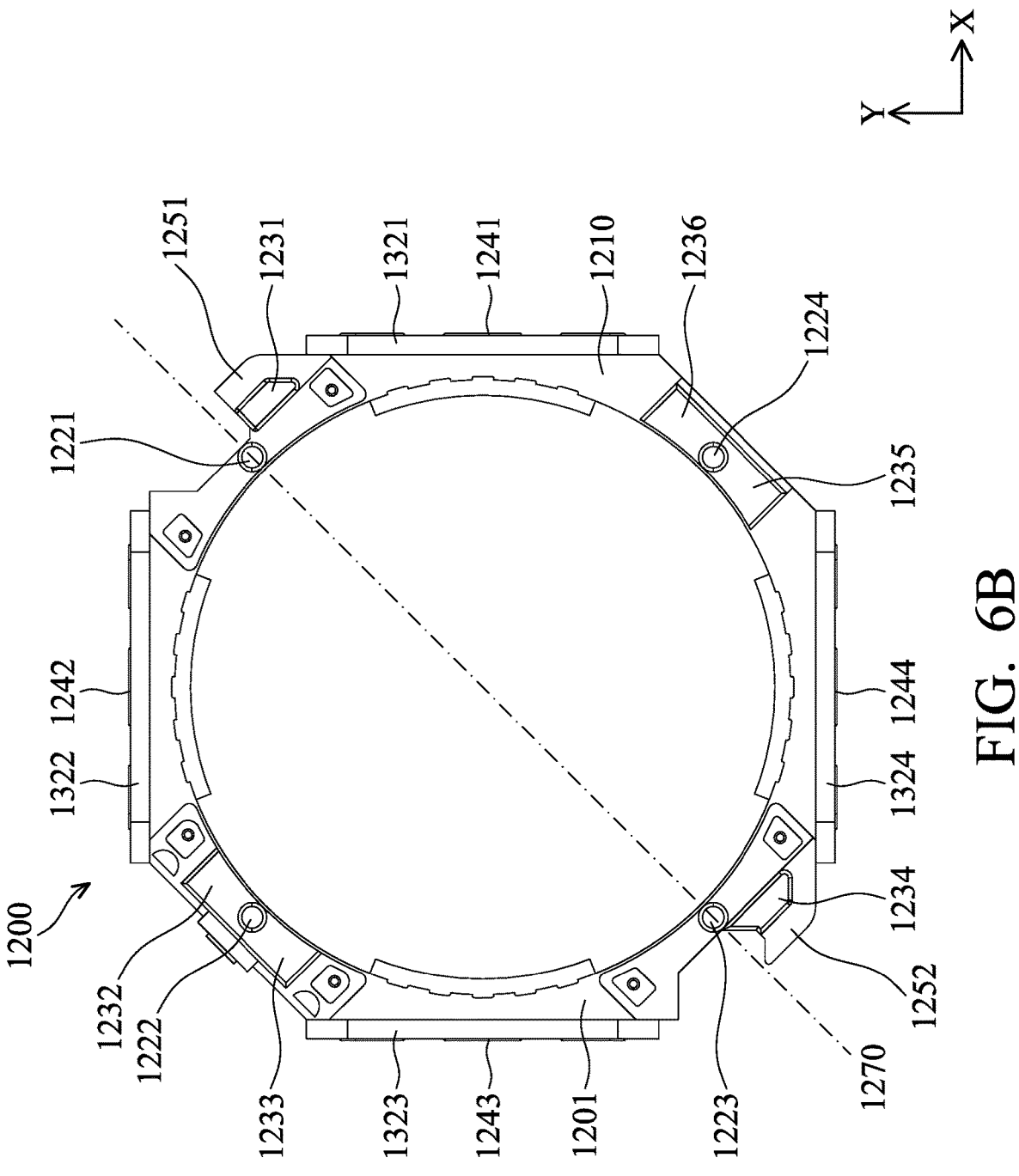
FIG. 6B is a top view of the movable portion and the driving coils.
Figure 6C:
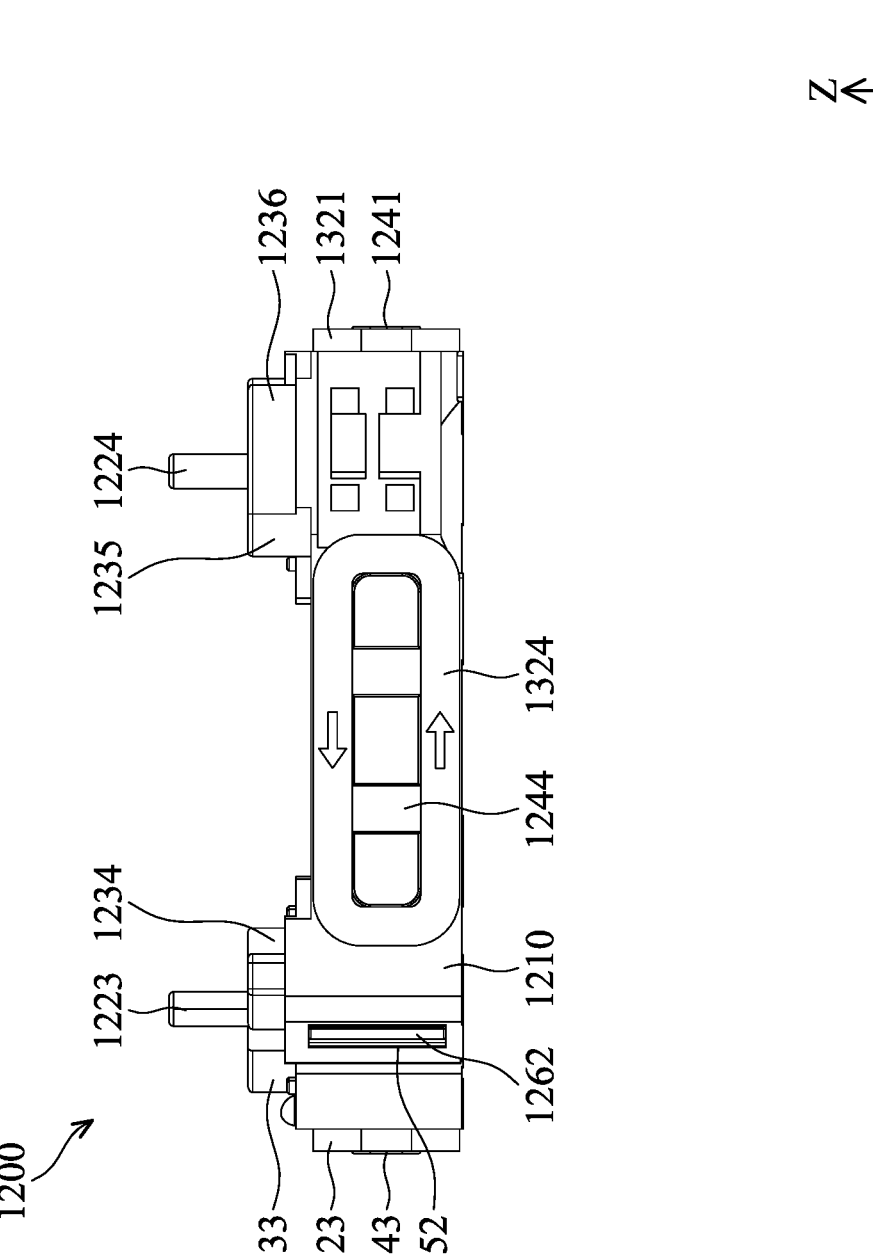
FIG. 6C is a side view of the movable portion and the driving coils.

FIG. 6A is a schematic view of the movable portion 1200 and the driving coils 1320. FIG. 6B is a top view of the movable portion 1200 and the driving coils 1320. FIG. 6C is a side view of the movable portion 1200 and the driving coils 1320. In some embodiments, as shown in FIG. 6A to FIG. 6C, the movable portion 1200 may mainly include a main body 1210, a first pressing portion 1221, a second pressing portion 1222, a third pressing portion 1223, a fourth pressing portion 1224, a first upper stopping portion 1231, a second upper stopping portion 1232, a third upper stopping portion 1233, a fourth upper stopping portion 1234, a fifth upper stopping portion 1235, a sixth upper stopping portion 1236, a first side stopping portion 1241, a second side stopping portion 1242, a third side stopping portion 1243, and a fourth side stopping portion 1244.

In some embodiments, the first pressing portion 1221, the second pressing portion 1222, the third pressing portion 1223, the fourth pressing portion 1224, the first upper stopping portion 1231, the second upper stopping portion 1232, the third upper stopping portion 1233, the fourth upper stopping portion 1234, the fifth upper stopping portion 1235, and the sixth upper stopping portion 1236 may extend from the main body 1210 in the first direction. As seen in FIG. 1C and FIG. 1D, when viewed in the first direction or the second direction, the first pressing portion 1221, the second pressing portion 1222, the third pressing portion 1223, and the fourth pressing portion 1224 are exposed from the case 1110. When viewed in the first direction, the first pressing portion 1221, the second pressing portion 1222, the third pressing portion 1223, and the fourth pressing portion 1224 are arranged in a counterclockwise manner around the main axis 1900. In some embodiments, materials for the first pressing portion 1221, the second pressing portion 1222, the third pressing portion 1223, and the fourth pressing portion 1224 may include soft materials (e.g. plastic).

In some embodiments, the first upper stopping portion 1231 is adjacent to the first pressing portion 1221, the second upper stopping portion 1232 and the third upper stopping portion 1233 are adjacent to the second pressing portion 1222, the fourth upper stopping portion 1234 is adjacent to the third pressing portion 1223, and the fifth upper stopping portion 1235 and the sixth upper stopping portion 1236 are adjacent to the fourth pressing portion 1224. In some embodiments, when viewed in the first direction, the connection 1270 passes through the first pressing portion 1221 and the third pressing portion 1223, and the first upper stopping portion 1231 and the fourth upper stopping portion 1234 are on a same side of the connection 1270. In some embodiments, when viewed in the first direction, the first upper stopping portion 1231, the second upper stopping portion 1232, the third upper stopping portion 1233, the fourth upper stopping portion 1234, the fifth upper stopping portion 1235, and the sixth upper stopping portion 1236 are arranged in a counterclockwise order around the main axis 1900. In some embodiments, the first upper stopping portion 1231, the second upper stopping portion 1232, the third upper stopping portion 1233, the fourth upper stopping portion 1234, the fifth upper stopping portion 1235, and the sixth upper stopping portion 1236 at least partially overlap with the case 1110 and do not expose from the case 1110.

In other words, when the movable portion 1200 moves in the Z direction, the first upper stopping portion 1231, the second upper stopping portion 1232, the third upper stopping portion 1233, the fourth upper stopping portion 1234, the fifth upper stopping portion 1235, and the sixth upper stopping portion 1236 may be used to restrict the range of motion of the movable portion 1200, while the first pressing portion 1221, the second pressing portion 1222, the third pressing portion 1223, and the fourth pressing portion 1224 may protrude from the case 1110 to allow external driving assembly to apply pressure to the movable portion 1200 and control the position of the movable portion 1200 (as explained later).

In some embodiments, the movable portion 1200 may also include a first opening 1251 and a second opening 1252, and the optical element driving mechanism 1000 may also include a first positioning magnetic element 1261 and a second positioning magnetic element 1262 disposed in the first opening 1251 and the second opening 1252, respectively. For example, the first positioning magnetic element 1261 and the second positioning magnetic element 1262 may be magnets and may be adjacent to the first guiding rod 1160 and the second guiding rod 1170, respectively. Due to the first guiding rod 1160 and the second guiding rod 1170 have magnetic permeable material, the first positioning magnetic element 1261 and the second positioning magnetic element 1262 may generate magnetic forces between the first guiding rod 1160 and the second guiding rod 1170, so that after the driving assembly 1300 is used to move the movable portion 1200 to a specific position, the position of the movable portion 1200 may be fixed without continuously providing power to the driving assembly 1300 to fix the position of the movable portion 1200, thus saving energy usage.

The first side stopping portion 1241, the second side stopping portion 1242, the third side stopping portion 1243, and the fourth side stopping portion 1244 may be disposed on the main body 1210 and extend towards the X or Y direction. The first driving coil 1321, the second driving coil 1322, the third driving coil 1323, and the fourth driving coil 1324 may be respectively disposed on the first side stopping portion 1241, the second side stopping portion 1242, the third side stopping portion 1243, and the fourth side stopping portion 1244, and the distance between the first side stopping portion 1241, the second side stopping portion 1242, the third side stopping portion 1243, and the fourth side stopping portion 1244 and the case 1110 may be less than the distance between the first driving coil 1321, the second driving coil 1322, the third driving coil 1323, and the fourth driving coil 1324 and the case 1110, in order to avoid direct collision between the first driving coil 1321, the second driving coil 1322, the third driving coil 1323, and the fourth driving coil 1324 and the case 1110.

In some embodiments, as shown in FIG. 2A and FIG. 6B, the movable portion 1200 may include a movable portion top surface 1201, and the optical element 1800 may include an optical element surface 1801, facing an identical direction (e.g. in the +Z direction). In addition, in some embodiments, a dust-catching element (not shown, such as a dust-catching adhesive) may be disposed on the movable portion top surface 1201 or the optical element surface 1801 to capture any dust generated during the operation of the optical element driving mechanism 1000, to avoid interfering with the photosensitivity of the optical element driving mechanism 1000.

Figure 7A:
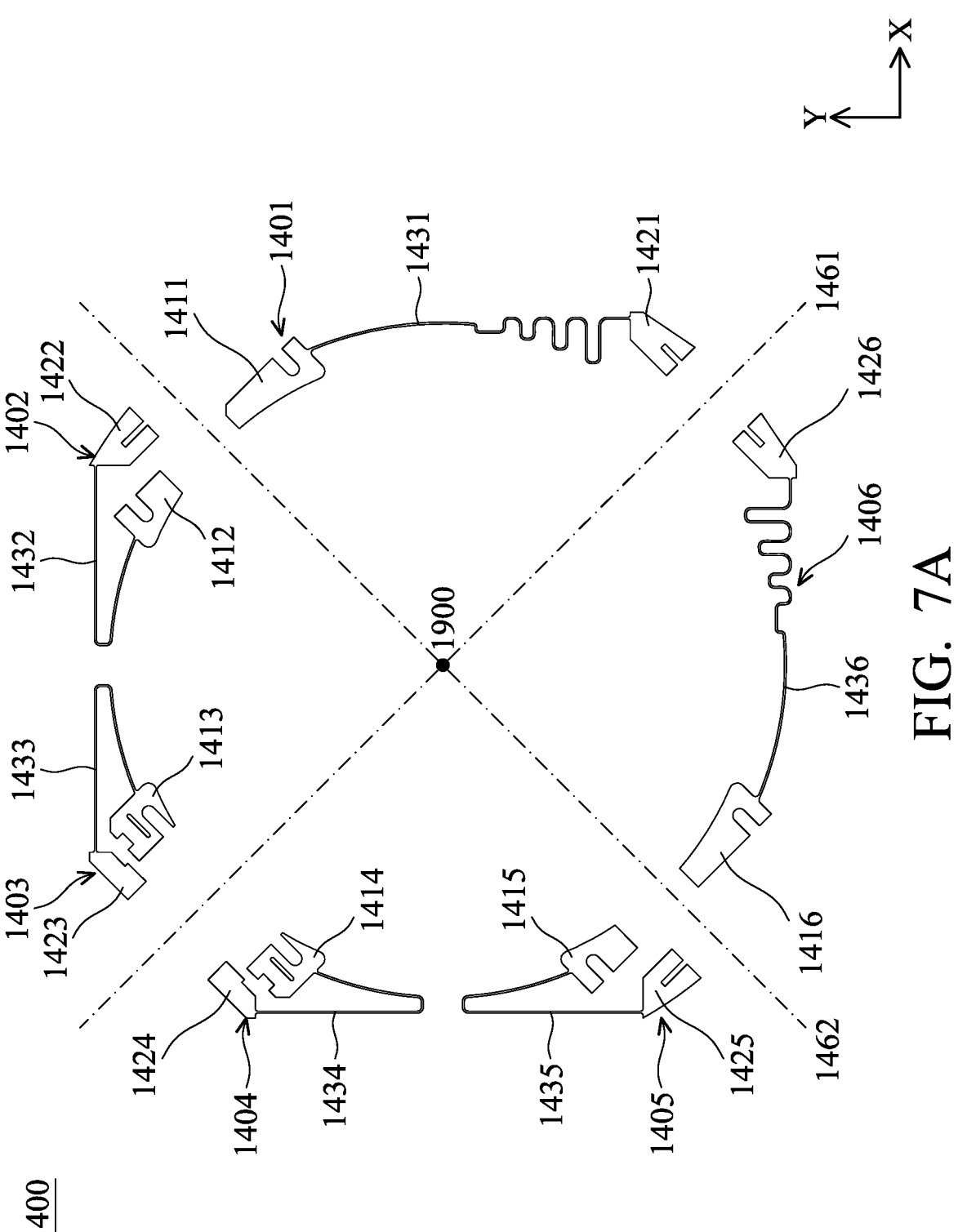
FIG. 7A is a schematic view of the first resilient element.

FIG. 7A is a schematic view of the first resilient element 1400. As shown in FIG. 2A and FIG. 7A, the first resilient element 1400 may include a first resilient unit 1401, a second resilient unit 1402, a third resilient unit 1403, a fourth resilient unit 1404, a fifth resilient unit 1405, and a sixth resilient unit 1406. The first resilient unit 1401 may be disposed on the first edge 1151, the second resilient unit 1402 and the third resilient unit 1403 may be disposed on the second edge 1152, the fourth resilient unit 1404 and the fifth resilient unit 1405 may be disposed on the third edge 1153, and the sixth resilient unit 1406 may be disposed on the fourth edge 1154. When observing along the main axis 1900, a first virtual line 1461 passes through the main axis 1900, the first resilient unit 1401 and the sixth resilient unit 1406 are symmetrical to the first virtual line 1461, the second resilient unit 1402 and the fifth resilient unit 1405 are symmetrical to the first virtual line 1461, and the third resilient unit 1403 and the fourth resilient unit 1404 are symmetrical to the first virtual line 1461. That is to say, the first virtual line 1461 may be the symmetrical axis of the first resilient element 1400, and the first virtual line 1461 does not pass through the first guiding rod 1160 and the second guiding rod 1170.

In some embodiments, a second virtual line 1462 passes through the first guiding rod 1160 and second guiding rod 1170, and the first virtual line 1461 and the second virtual line 1462 are vertically oriented with respect to each other. In some embodiments, when viewed along the main axis 1900, the first resilient unit 1401 and the sixth resilient unit 1406 are located on one side of the second virtual line 1462 and the second resilient unit 1402, the third resilient unit 1403, the fourth resilient unit 1404, and the fifth resilient unit 1405 are located on the other side of the second virtual line 1462. Additionally, the second virtual line 1462 does not pass through the first resilient element 1400.

The first resilient element 1400 may be electrically connected to the circuits in the fixed portion 1100 and the movable portion 1200. For example, the first resilient unit 1401 may include a first movable portion connecting portion 1411, a first fixed portion connecting portion 1421, and a first string 1431. The second resilient unit 1402 may include a second movable portion connecting portion 1412, a second fixed portion connecting portion 1422, and a second string 1432. The third resilient unit 1403 may include a third movable portion connecting portion 1413, a third fixed portion connecting portion 1423, and a third string 1433. The fourth resilient unit 1404 may include a fourth movable portion connecting portion 1414, a fourth fixed portion connecting portion 1424, and a fourth string 1434. The fifth resilient unit 1405 may include a fifth movable portion connecting portion 1415, a fifth fixed portion connecting portion 1425, and a fifth string 1435. The sixth resilient unit 1406 may include a sixth movable portion connecting portion 1416, a sixth fixed portion connecting portion 1426, and a sixth string 1436.

In some embodiments, the first movable portion connecting portion 1411, the second movable portion connecting portion 1412, the third movable portion connecting portion 1413, the fourth movable portion connecting portion 1414, the fifth movable portion connecting portion 1415, and the sixth movable portion connecting portion 1416 may be disposed on the movable portion 1200, while the first fixed portion connecting portion 1421, the second fixed portion connecting portion 1422, the third fixed portion connecting portion 1423, the fourth fixed portion connecting portion 1424, the fifth fixed portion connecting portion 1425, and the sixth fixed portion connecting portion 1426 may be disposed on the fixed portion 1100. In this way, electrical connections may be made between the circuits in the fixed portion 1100 and the movable portion 1200.

In some embodiments, the first string 1431 connects the first movable portion connecting portion 1411 and the first fixed portion connecting portion 1421. The second string 1432 connects the second movable portion connecting portion 1412 and the second fixed portion connecting portion 1422. The third string 1433 connects the third movable portion connecting portion 1413 and the third fixed portion connecting portion 1423. The fourth string 1434 connects the fourth movable portion connecting portion 1414 and the fourth fixed portion connecting portion 1424. The fifth string 1435 connects the fifth movable portion connecting portion 1415 and the fifth fixed portion connecting portion 1425. The sixth string 1436 connects the sixth movable portion connecting portion 1416 and the sixth fixed portion connecting portion 1426.

In some embodiments, the first resilient unit 1401 and the sixth resilient unit 1406 may have symmetrical structures, while the second resilient unit 1402, the third resilient unit 1403, the fourth resilient unit 1404, and the fifth resilient unit 1405 may have similar structures. For example, the distance between the first movable portion connecting portion 1411 and the first fixed portion connecting portion 1421 or the distance between the sixth movable portion connecting portion 1416 and the sixth fixed portion connecting portion 1426 may be greater than the distance between the second movable portion connecting portion 1412 and the second fixed portion connecting portion 1422, the distance between the third movable portion connecting portion 1413 and the third fixed portion connecting portion 1423, the distance between the fourth movable portion connecting portion 1414 and the fourth fixed portion connecting portion 1424, or the distance between the fifth movable portion connecting portion 1415 and the fifth fixed portion connecting portion 1425.

Figure 7B:
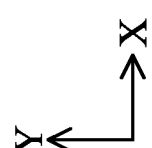
FIG. 7B is an enlarged view of the second resilient unit.
Figure 7B:
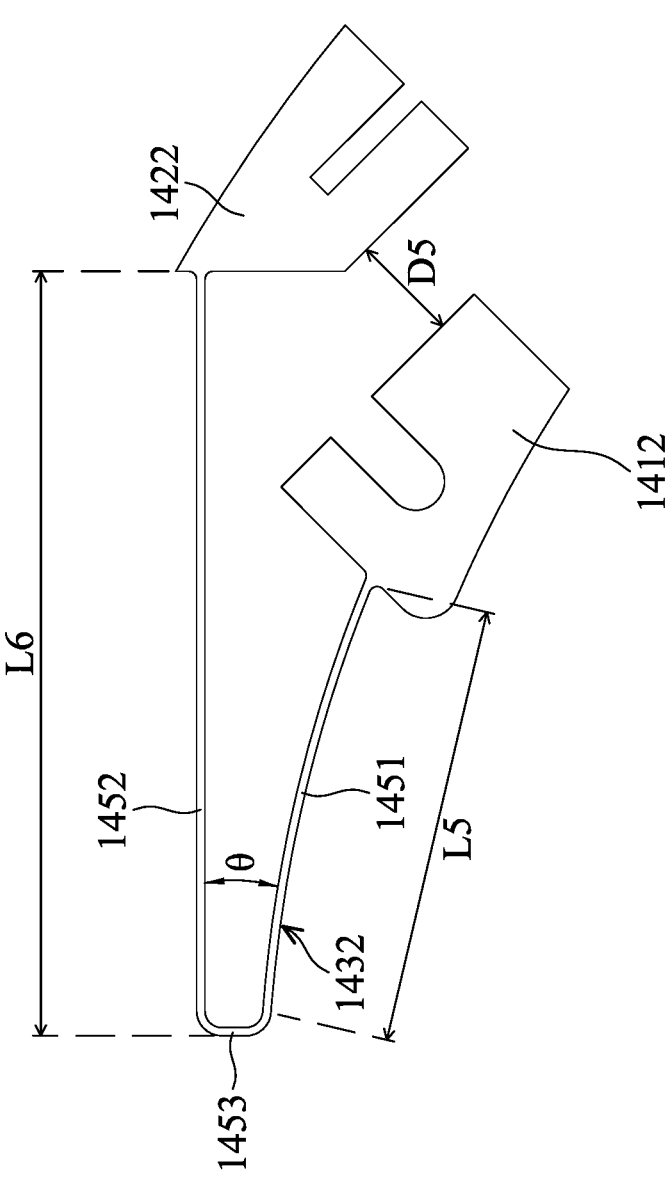

In some embodiments, since the second resilient unit 1402, the third resilient unit 1403, the fourth resilient unit 1404, and the fifth resilient unit 1405 may have similar structures, the structure details are further explained with the second resilient unit 1402 as an example. FIG. 7B is an enlarged view of the second resilient unit 1402. The second string 1432 of the second resilient unit 1402 may also include a second string first portion 1451, a second string second portion 1452, and a second string bending portion 1453. The second string first portion 1451 may connect to the second movable portion connecting portion 1412, the second string second portion 1452 may connect to the second fixed portion connecting portion 1422, and the second string bending portion 1453 may connect to the second string first portion 1451 and the second string second portion 1452.

It should be noted that in some embodiments, the second string first portion 1451 and the second string second portion 1452 may extend in different directions, and an angle θ between the second string first portion 1451 and the second string second portion 1452 is acute. In some embodiments, the angle θ may be less than 45 degrees. In some embodiments, a distance D5 between the second movable portion connecting portion 1412 and the second fixed portion connecting portion 1422 is smaller than a length L5 of the second string first portion 1451 and a length L6 of the second string second portion 1452. In other words, the second resilient unit 1402 (and other similar resilient units) is not designed to bear weight, but to conduct electricity, thus reducing the size of the second resilient unit 1402 and achieving miniaturization.

In some embodiments, the first movable portion connecting portion 1411, the second fixed portion connecting portion 1422, and the second movable portion connecting portion 1412 may be disposed on the fifth edge 1155, the third fixed portion connecting portion 1423, the third movable portion connecting portion 1413, the fourth fixed portion connecting portion 1424, and the fourth movable portion connecting portion 1414 may be disposed on the sixth edge 1156. The fifth fixed portion connecting portion 1425, the fifth movable portion connecting portion 1415, and the sixth movable portion connecting portion 1416 may be disposed on the seventh edge 1157, while the first fixed portion connecting portion 1421 and the sixth fixed portion connecting portion 1426 may be disposed on the eighth edge 1158.

Figure 8:
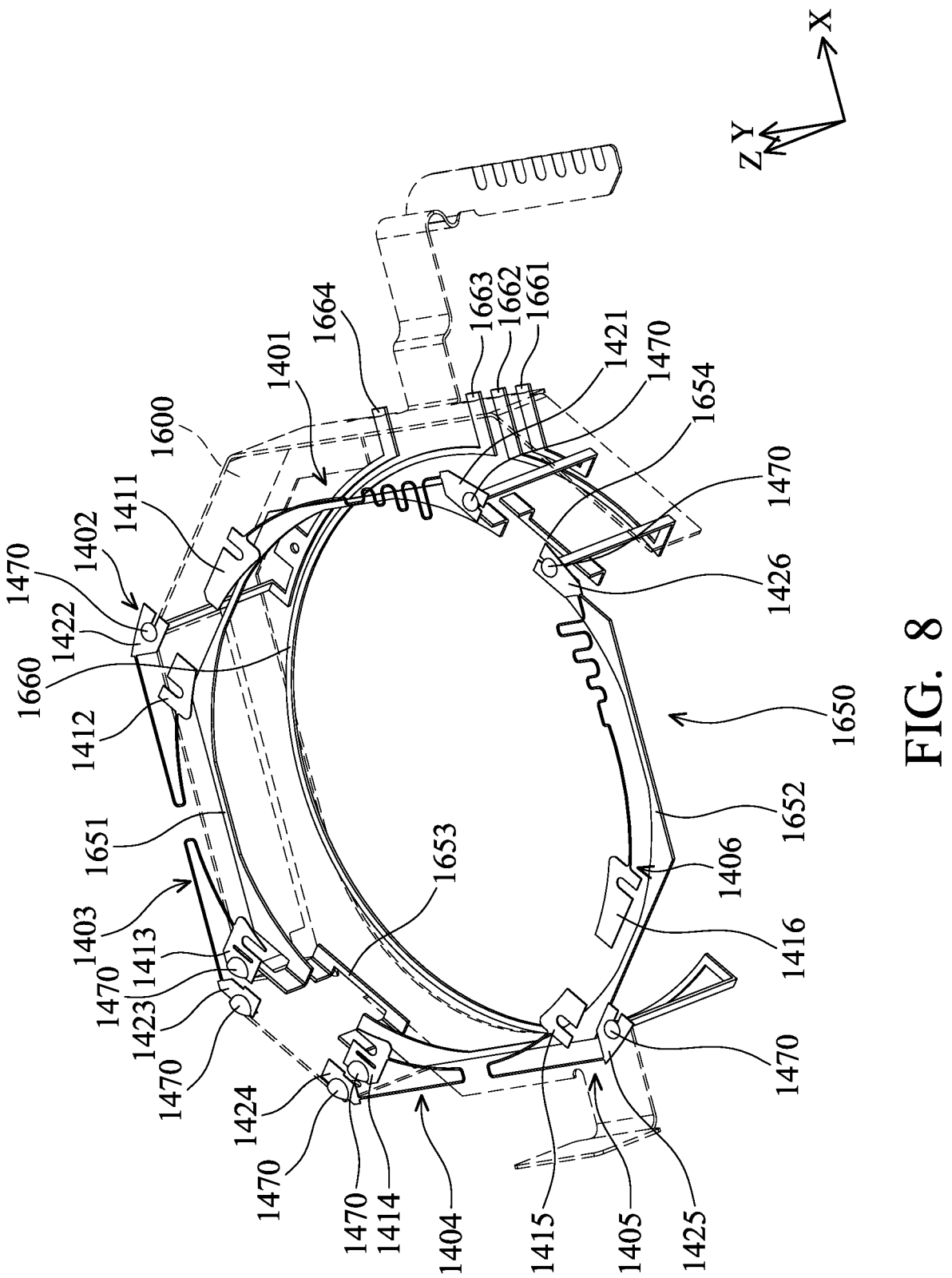
FIG. 8 is a schematic view of some elements of the optical element driving mechanism.

FIG. 8 is a schematic view of some elements of the optical element driving mechanism 1000, mainly showing the first resilient element 1400, the circuit assembly 1600, the first conductive assembly 1650 embedded in the movable portion 1200, and the conductive assembly 1660 embedded in the base 1130. In some embodiments, the first conductive assembly 1650 and the conductive assembly 1660 may be electrically insulating from each other.

In some embodiments, the first conductive assembly 1650 may include a first conductive portion 1651, a second conductive portion 1652, a third conductive portion 1653, and a fourth conductive portion 1654, and in the first direction, the first conductive portion 1651 and the second conductive portion 1652 are at different heights from the third conductive portion 1653 and the fourth conductive portion 1654. The circuit assembly 1600 may be electrically connected to the first driving coil 1321 and the second driving coil 1322 via the third resilient unit 1403 and the first conductive portion 1651, and may be electrically connected to the third driving coil 1323 and the fourth driving coil 1324 via the fourth resilient unit 1404 and the second conductive portion 1652, thus allowing the first driving coil 1321 connects the second driving coil 1322 in series, and allowing the third driving coil 1323 connects the fourth driving coil 1324 in series. In some embodiments, the first driving coil 1321 and the second driving coil 1322 are connected to the third driving coil 1323 and the fourth driving coil 1324 in parallel via the third conductive portion 1653 and the fourth conductive portion 1654.

In some embodiments, an additional optical module (not shown) may be disposed on the optical element driving mechanism 1000, such as an aperture. Additionally, the optical module may be electrically connected to the conductive assembly 1660 via the first resilient unit 1401, the second resilient unit 1402, the fifth resilient unit 1405, and the sixth resilient unit 1406 of the first resilient element 1400 to control the optical module. Furthermore, the third resilient unit 1403 and the fourth resilient unit 1404 are electrically insulated from the first resilient unit 1401, the second resilient unit 1402, the fifth resilient unit 1405, and the sixth resilient unit 1406 to avoid interference between the signals controlling the optical element driving mechanism 1000 and the signals controlling the optical module.

In some embodiments, as shown in FIG. 2A and FIG. 8, the conductive assembly 1660 may include a first terminal 1661, a second terminal 1662, a third terminal 1663, and a fourth terminal 1664 arranged in sequence on the first edge 1151. The first terminal 1661, the second terminal 1662, the third terminal 1663, and the fourth terminal 1664 may be sequentially electrically connected to the first resilient unit 1401, the sixth resilient unit 1406, the fifth resilient unit 1405, and the second resilient unit 1402, respectively, to separately control each driving coil.

In some embodiments, the optical element driving mechanism 1000 may also include an adhesive element 1470 (e.g., a conductive adhesive element, such as a solder ball or silver paste), disposed on the first fixed portion connecting portion 1421, the second fixed portion connecting portion 1422, the third movable portion connecting portion 1413, the third fixed portion connecting portion 1423, the fourth movable portion connecting portion 1414, the fourth fixed portion connecting portion 1424, the fifth fixed portion connecting portion 1425, the sixth fixed portion connecting portion 1426, to electrically connect the first resilient element 1400, the first conductive assembly 1650, and the conductive assembly 1660.

Figure 9A:
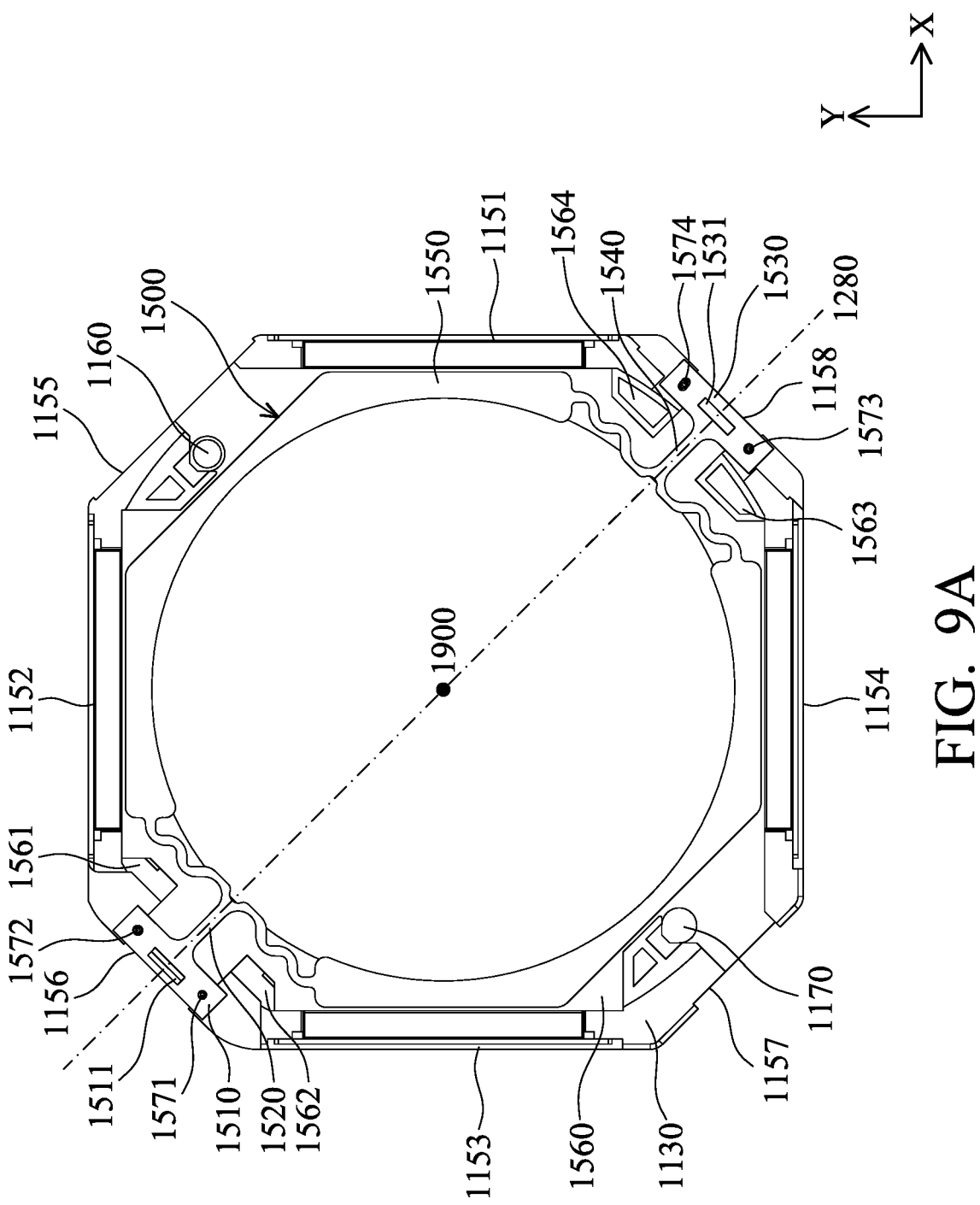
FIG. 9A is a schematic view of some elements of the optical element driving mechanism, mainly showing the base and the second resilient element.
Figure 9B:
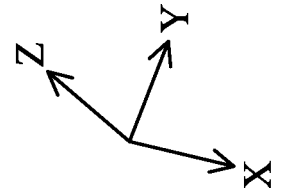
FIG. 9B is an enlarged view of some elements of the optical element driving mechanism.
Figure 9B:
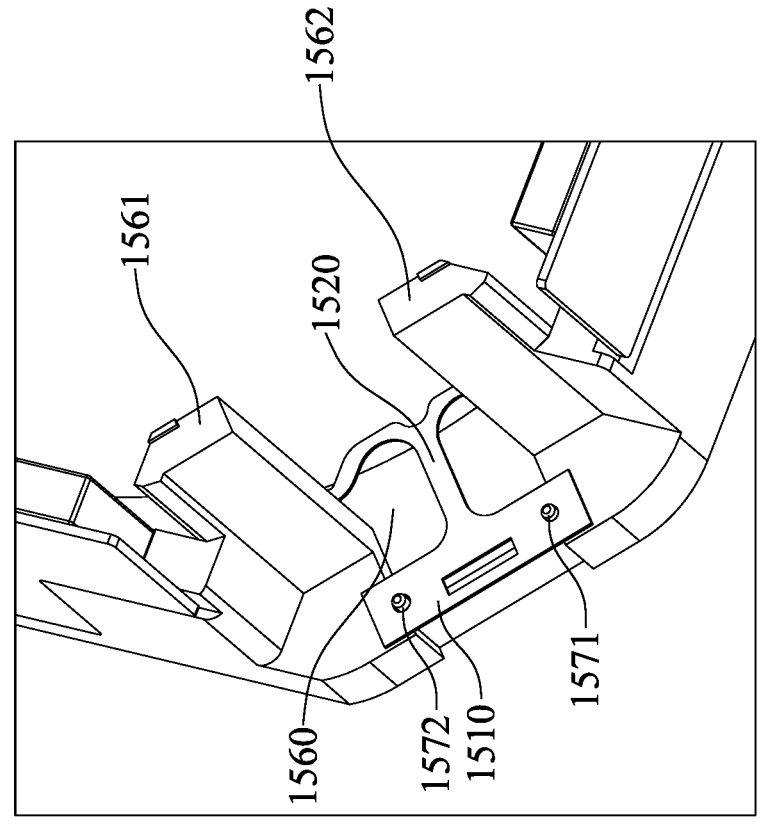

FIG. 9A is a schematic view of some elements of the optical element driving mechanism 1000, mainly showing the base 1130 and the second resilient element 1500. FIG. 9B is an enlarged view of some elements of the optical element driving mechanism 1000. In some embodiments, the second resilient element 1500 may mainly include a first base connecting portion 1510, a first string portion 1520, a second base connecting portion 1530, a second string portion 1540, and a contact portion 1550. The first base connecting portion 1510 and the second base connecting portion 1530 may be used to connect the base 1130, the first string portion 1520 may be used to connect the first base connecting portion 1510 and the contact portion 1550, and the second string portion 1540 may be used to connect the second base connecting portion 1530 and the contact portion 1550. In some embodiments, when viewed in the first direction, the first base connecting portion 1510 and the second base connecting portion 1530 may be disposed on opposite sides of the base 1130, and the first string portion 1520 and the second string portion 1540 may also be disposed on opposite sides of the base 1130. Additionally, the first guiding rod 1160, the second guiding rod 1170, the first base connecting portion 1510, and the first string portion 1520 may be disposed on different sides of the base 1130 to further utilize the space of the optical element driving mechanism 1000.

In some embodiments, the contact portion 1550 may be disposed on the first edge 1151, the second edge 1152, the third edge 1153, and the fourth edge 1154, while the first base connecting portion 1510 and the first string portion 1520 may be disposed on the sixth edge 1156, and the second base connecting portion 1530 and the second string portion 1540 may be disposed on the eighth edge 1158. In other words, the first base connecting portion 1510, the second base connecting portion 1530, and the contact portion 1550 may be located on different sides of the base 1130. It should be noted that the first edge 1151, the second edge 1152, the third edge 1153, the fourth edge 1154, the fifth edge 1155, and the seventh edge 1157 are not in direct contact with the second resilient element 1500, but are separated from the second resilient element 1500 by a distance in the first direction (as shown in FIG. 1E and FIG. 1F).

In some embodiments, the base 1130 may further include a main body 1560, a first protrusion 1561, a second protrusion 1562, a third protrusion 1563, the fourth protrusion 1564, the first connecting element 1571, the second connecting element 1572, the third connecting element 1573, and the fourth connecting element 1574, which may protrude in the first direction from the main body 1560. The first string portion 1520 may be disposed between the first protrusion second protrusion 1562 and the second protrusion 1562, while the second string portion 1540 may be disposed between the third protrusion 1563 and the fourth protrusion 1564, to protect the first string portion 1520 and the second string portion 1540. The first connecting element 1571 and the second connecting element 1572 may pass through the first base connecting portion 1510, and the third connecting element 1573 and the fourth connecting element 1574 may pass through the second base connecting portion 1530, to secure the relative position between the second resilient element 1500 and the base 1130.

In some embodiments, a connection 1280 may pass through the first string portion 1520, the second string portion 1540, and the main axis 1900, with the first connecting element 1571 and the second connecting element 1572 being disposed on opposite sides of the connection 1280, and the third connecting element 1573 and the fourth connecting element 1574 also being disposed on opposite sides of the connection 1280. In some embodiments, the first base connecting portion 1510 may include a first opening 1511, the second base connecting portion 1530 may include a second opening 1531, and when viewed in the first direction, at least a portion of the base 1130 may be exposed from the first opening 1511 and the second opening 1531. The first opening 1511 may be disposed between the first connecting element 1571 and the second connecting element 1572, the second opening 1531 may be disposed between the third connecting element 1573 and the fourth connecting element 1574, and the connection 1280 may pass through the first opening 1511 and the second opening 1531. In some embodiments, additional adhesive elements (not shown) may be disposed on the first opening 1511 and the second opening 1531 and in direct contact with the base 1130 and the second resilient element 1500 to further fix the relative position of the base 1130 and the second resilient element 1500.

In some embodiments, the thickness of first resilient element 1400 may differ from that of the second resilient element 1500. For example, the thickness of first resilient element 1400 may be less than that of the second resilient element 1500. In some embodiments, a ratio of the thickness of first resilient element 1400 to that of second resilient element 1500 may be between about 0.5 and about 0.8, allowing second resilient element 1500 to have a higher mechanical strength.

Figure 9C:
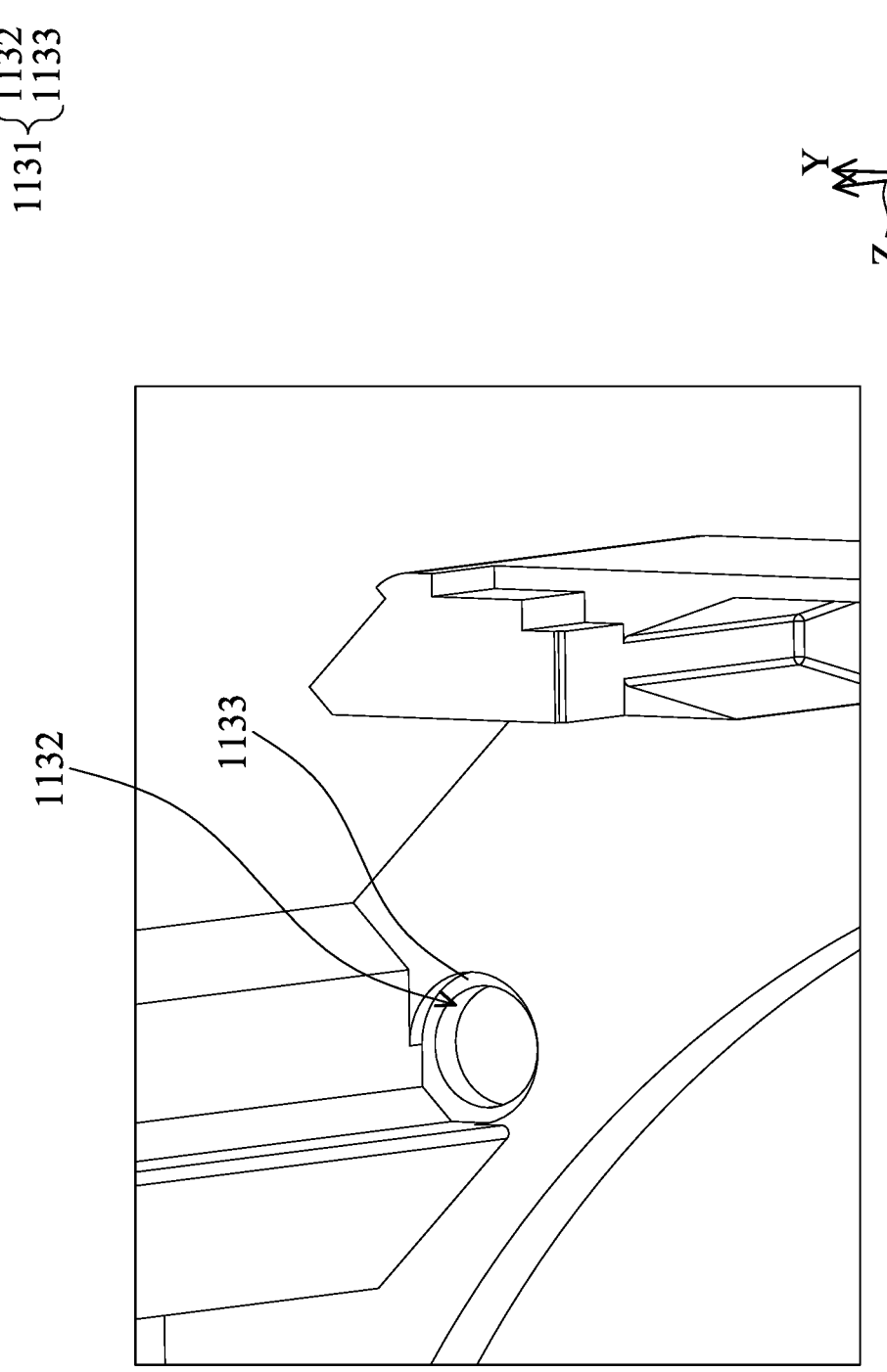
FIG. 9C is an enlarged view of a portion of the base.

FIG. 9C is an enlarged view of a portion of the base 1130. As shown in FIG. 1F and FIG. 9C, the base 1130 may include a first guiding rod disposing portion 1131 and a second guiding rod disposing portion 1134, the first guiding rod disposing portion 1131 may include a first guiding rod disposing recess 1132 and a first guiding rod disposing surface 1133, and the second guiding rod disposing portion 1134 may include a second guiding rod disposing recess 1135. In some embodiments, the first guiding rod disposing surface 1133 is disposed in the first guiding rod disposing recess 1132, the first guiding rod 1160 is disposed in and protruding from the first guiding rod disposing recess 1132 and directly contacts the first guiding rod disposing surface 1133. The second guiding rod 1170 may be disposed on the second guiding rod disposing recess 1135 to fix the relative position of the first guiding rod 1160, the second guiding rod 1170, and the base 1130. In some embodiments, the first guiding rod disposing recess 1132 and the second guiding rod disposing recess 1135 may also include structures with openings.

Figure 10A:
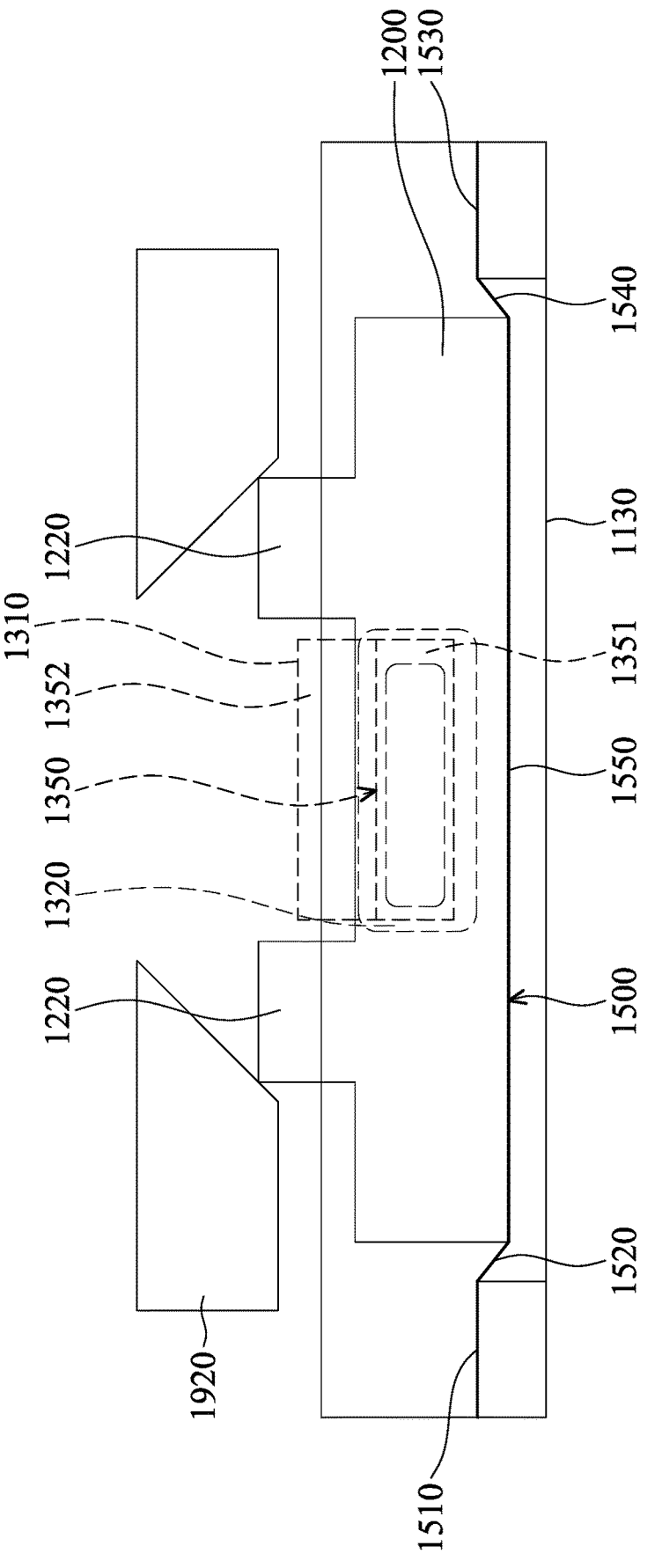
FIG. 10A and FIG. 10B are schematic views showing the switching of the optical element driving mechanism from a first state to a second state through an external driving assembly.
Figure 10B:
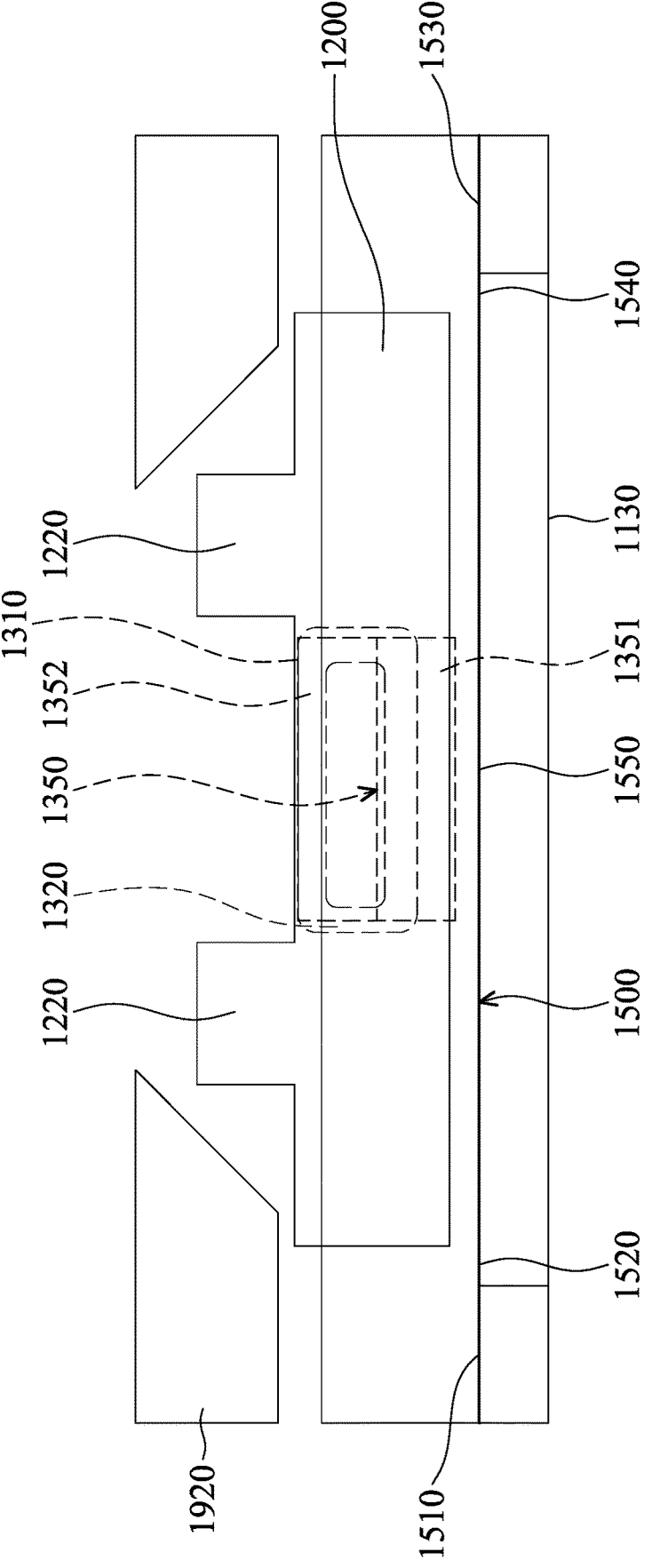

FIG. 10A and FIG. 10B are schematic views showing the switching of the optical element driving mechanism 1000 from a first state (FIG. 10A) to a second state (FIG. 10B) through an external driving assembly 1920. As shown in FIG. 10A, in the first state, the movable portion 1200 directly contacts the second resilient element 1500 and is separated from the fixed portion 1100. At this time, the movable portion 1200 is in the first position. It should be noted that the first driving magnetic unit 1351 of the driving magnetic elements 1310 may contact the second driving magnetic unit 1352, which means the interface 1350 is between the first driving magnetic unit 1351 and the second driving magnetic unit 1352. When viewed from the second direction in the first state, the driving coils 1320 and the interface 1350 at least partially overlap each other.

In some embodiments, the pressing portion 1220 of the movable portion 1200 (such as the first pressing portion 1221, the second pressing portion 1222, the third pressing portion 1223, and the fourth pressing portion 1224) may at least partially exposed from the base 1130, and the external driving assembly 1920 may directly contact the pressing portion 1220 to apply a first downward force to the movable portion 1200 through the pressing portion 1220. Thus, the movable portion 1200 may directly contact the contact portion 1550 of the second resilient element 1500, so that the first base connecting portion 1510 (and the second base connecting portion 1530) and the contact portion 1550 are in different planes. At this time, the second resilient element 1500 undergoes deformation and then applies an upward second force to the movable portion 1200 through the contact portion 1550, and the first force and the second force are in opposite directions, so as to fix the movable portion 1200 in the first position.

Then, as shown in FIG. 10B, by moving the external driving assembly 1920 away from the pressing portion 1220, the movable portion 1200 is only subjected to the second force provided by the second resilient element 1500, causing the movable portion 1200 to move upwardly (+Z direction) along the main axis 1900 to reach the second position. Then, the driving assembly 1300 applies an upward driving force on the movable portion 1200 to further drive the movable portion 1200 to the third position, which is referred to as a second state. The optical element driving mechanism 1000 may move during the second state to achieve auto focusing. It should be noted that during the second state, the first base connecting portion 1510 (and the second base connecting portion 1530) and the contact portion 1550 may be in a same plane, meaning that the movable portion 1200 and the second resilient element 1500 may be separated from each other to prevent the second resilient element 1500 from affecting the movement of the movable portion 1200. It should be noted that when the optical element driving mechanism 1000 operates later, the movable portion 1200 and second resilient element 1500 may be separated from each other, and the pressing portion 1220 is at least partially exposed from the base 1130.

Next, when retracting the movable portion 1200 into the fixed portion 1100, since the pressing portion 1220 is partially exposed from the base 1130, the first force may be reapplied to the pressing portion 1220 of the movable portion 1200 by the external driving assembly 1920 to drive the movable portion 1200 reaching the first position, returning to the state shown in the FIG. 10A. Most of the movable portion 1200 may be accommodated within the fixed portion 1100 to reduce the size of optical element driving mechanism 1000 in the Z direction and achieve miniaturization, and the movable portion 1200 may be protected.

In summary, some embodiments of the present disclosure provide an optical element driving mechanism that includes a movable portion, a fixed portion, and a driving assembly. The movable portion is used to connect the optical element. The movable portion may move relative to the fixed portion. The driving assembly is used to drive the movable portion to move relative to the fixed portion. This allows an external driving assembly to move the movable portion, thereby enabling the movement of optical elements with larger sizes and also achieving miniaturization.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
   a movable portion used for connecting an optical element;
   a fixed portion comprising a case and a base arranged along a main axis, and the fixed portion further comprises a first side, a second side, a third side, and a fourth side, wherein the movable portion is movable relative to the fixed portion;
   a driving assembly used for driving the movable portion to move relative to the fixed portion, wherein the driving assembly comprises:
      a first driving magnetic element disposed on the first side;
      a second driving magnetic element disposed on the second side;
      a third driving magnetic element disposed on the third side;
      a fourth driving magnetic element disposed on the fourth side;
      a first driving coil disposed on the movable portion and corresponding to the first driving magnetic element;
      a second driving coil disposed on the movable portion and corresponding to the second driving magnetic element, wherein the first driving coil connects to the second driving coil in series;
      a third driving coil disposed on the movable portion and corresponding to the third driving magnetic element; and
      a fourth driving coil disposed on the movable portion and corresponding to the fourth driving magnetic element, wherein the third driving coil connects to the fourth driving coil in series, and the first driving coil and the second driving coil connect to the third driving coil and the fourth driving coil in parallel;
   a first guiding rod disposed on the fixed portion and in contact with the movable portion, wherein the first guiding rod comprises a first guiding rod first end and a first guiding rod second end, the first guiding rod first end connects to the base, and the first guiding rod second end connects to the case; and
   a second guiding rod disposed on the fixed portion and in contact with the movable portion, wherein the second guiding rod comprises a first end of second guiding rod and a second end of second guiding rod, the first end of second guiding rod connects to the base, and the second end of second guiding rod connects to the case,
   wherein the first guiding rod and the second guiding rod are disposed on opposite sides of the movable portion.

2. The optical element driving mechanism as claimed in claim 1, further comprising:

a first resilient element connecting the movable portion and the fixed portion, used for electrically connecting the optical element driving mechanism and an optical module; and a second resilient element disposed on the fixed portion; wherein:

the first resilient element and the second resilient element are disposed on opposite sides of the movable portion in a first direction;

the first resilient element and the second resilient element are different in thickness.

3. The optical element driving mechanism as claimed in claim 2, wherein:

a thickness of the first resilient element is less than a thickness of the second resilient element;

the driving assembly is disposed on the first side, the second side, the third side, and the fourth side;

the first side is opposite to the third side;

the second side is opposite to the fourth side;

the main axis extends in the first direction.

4. The optical element driving mechanism as claimed in claim 3, wherein when viewed along the main axis, the first resilient element comprises:

a first resilient unit disposed on the first side;

a second resilient unit disposed on the second side;

a third resilient unit disposed on the second side;

a fourth resilient unit disposed on the third side;

a fifth resilient unit disposed on the third side; and a sixth resilient unit disposed on the fourth side.

5. The optical element driving mechanism as claimed in claim 4, wherein:

a first virtual line passes through the main axis when viewed along the main axis;

the first resilient unit and the sixth resilient unit are symmetrical to the first virtual line;

the second resilient unit and the fifth resilient unit are symmetrical to the first virtual line;

the third resilient unit and the fourth resilient unit are symmetrical to the first virtual line.

6. The optical element driving mechanism as claimed in claim 5, a second virtual line passes through the first guiding rod and the second guiding rod when viewed along the main axis;

the first virtual line is perpendicular to the second virtual line.

7. The optical element driving mechanism as claimed in claim 6, wherein:

when viewed along the main axis, the first resilient unit and the sixth resilient unit are disposed on a side of the second virtual line, and the second resilient unit, the third resilient unit, the fourth resilient unit, and the fifth resilient unit are disposed on another side of the second virtual line;

the second virtual line does not pass through the first resilient element.

8. The optical element driving mechanism as claimed in claim 7, wherein:

the first resilient unit comprises:

a first movable portion connecting portion disposed on the movable portion;

a first fixed portion connecting portion disposed on the fixed portion; and a first string connecting the first movable portion connecting portion and the first fixed portion connecting portion;

the second resilient unit comprises:

a second movable portion connecting portion disposed on the movable portion;

a second fixed portion connecting portion disposed on the fixed portion; and a second string connecting the second movable portion connecting portion and the second fixed portion connecting portion;

the third resilient unit comprises:

a third movable portion connecting portion disposed on the movable portion;

a third fixed portion connecting portion disposed on the fixed portion; and a third string connecting the third movable portion connecting portion and the third fixed portion connecting portion;

the fourth resilient unit comprises:

a fourth movable portion connecting portion disposed on the movable portion;

a fourth fixed portion connecting portion disposed on the fixed portion; and a fourth string connecting the fourth movable portion connecting portion and the fourth fixed portion connecting portion;

the fifth resilient unit comprises:

a fifth movable portion connecting portion disposed on the movable portion;

a fifth fixed portion connecting portion disposed on the fixed portion; and a fifth string connecting the fifth movable portion connecting portion and the fifth fixed portion connecting portion;

the sixth resilient unit comprises:

a sixth movable portion connecting portion disposed on the movable portion;

a sixth fixed portion connecting portion disposed on the fixed portion; and a sixth string connecting the sixth movable portion connecting portion and the sixth fixed portion connecting portion.

9. The optical element driving mechanism as claimed in claim 8, wherein:

a distance between the first movable portion connecting portion and the first fixed portion connecting portion is greater than a distance between the second movable portion connecting portion and the second fixed portion connecting portion;

a distance between the first movable portion connecting portion and the first fixed portion connecting portion is greater than a distance between the third movable portion connecting portion and the third fixed portion connecting portion;

a distance between the sixth movable portion connecting portion and the sixth fixed portion connecting portion is greater than a distance between the fourth movable portion connecting portion and the fourth fixed portion connecting portion;

a distance between the sixth movable portion connecting portion and the sixth fixed portion connecting portion is greater than a distance between the fifth movable portion connecting portion and the fifth fixed portion connecting portion.

10. The optical element driving mechanism as claimed in claim 9, wherein the second string comprises:

a second string first portion connecting to the second movable portion connecting portion;

a second string second portion connecting to the second fixed portion connecting portion; and a second string bending portion connecting the second string first portion and the second string second portion.

11. The optical element driving mechanism as claimed in claim 10, wherein:

the second string first portion and the second string second portion extend in different directions, and an angle between the second string first portion and the second string second portion is acute;

a distance between the second movable portion connecting portion and the second fixed portion connecting portion is less than a length of the second string first portion;

the distance between the second movable portion connecting portion and the second fixed portion connecting portion is less than a length of the second string second portion.

12. The optical element driving mechanism as claimed in claim 11, wherein:

the fixed portion further comprises a fifth side, a sixth side, a seventh side, and an eighth side;

the fifth side is between the first side and the second side;

the sixth side is between the second side and the third side;

the seventh side is between the third side and the fourth side;

the eighth side is between the fourth side and the first side;

the first movable portion connecting portion, the second fixed portion connecting portion, and the second movable portion connecting portion are disposed on the fifth side;

the third fixed portion connecting portion, the third movable portion connecting portion, the fourth fixed portion connecting portion, and the fourth movable portion connecting portion are disposed on the sixth side;

the fifth fixed portion connecting portion, the fifth movable portion connecting portion, and the sixth movable portion connecting portion are disposed on the seventh side;

the first fixed portion connecting portion and the sixth fixed portion connecting portion are disposed on the eighth side.

13. The optical element driving mechanism as claimed in claim 12, further comprising an adhesive element disposed on the first movable portion connecting portion, the first fixed portion connecting portion, the second movable portion connecting portion, the second fixed portion connecting portion, the third movable portion connecting portion, the third fixed portion connecting portion, the fourth movable portion connecting portion, the fourth fixed portion connecting portion, the fifth movable portion connecting portion, the fifth fixed portion connecting portion, the sixth movable portion connecting portion, and the sixth fixed portion connecting portion.

14. The optical element driving mechanism as claimed in claim 13, further comprising:

a circuit assembly surrounding the movable portion;

a first conductive assembly embedded in the movable portion and comprising a first conductive portion, a second conductive portion, a third conductive portion, and a fourth conductive portion; and a second conductive assembly embedded in the base.

15. The optical element driving mechanism as claimed in claim 14, wherein:

the circuit assembly electrically connects to the first driving coil and the second driving coil via the third resilient unit and the first conductive portion;

the circuit assembly electrically connects to the third driving coil and the fourth driving coil via the fourth resilient unit and the second conductive portion;

the first driving coil and the second driving coil connect to the third driving coil and the fourth driving coil in parallel via the third conductive portion and the fourth conductive portion.

16. The optical element driving mechanism as claimed in claim 15, wherein:

the optical module electrically connects to the second conductive assembly via the first resilient unit, the second resilient unit, the fifth resilient unit, and the sixth resilient unit;

the first conductive assembly is electrically insulated from the second conductive assembly;

the third resilient unit and the fourth resilient unit are electrically insulated from the first resilient unit, the second resilient unit, the fifth resilient unit, and the sixth resilient unit.

17. The optical element driving mechanism as claimed in claim 16, wherein:

the second conductive assembly comprises a first terminal, a second terminal, a third terminal, and a fourth terminal sequentially arranged on the first side;

the first terminal electrically connects to the first resilient unit;

the second terminal electrically connects to the sixth resilient unit;

the third terminal electrically connects to the fifth resilient unit;

the fourth terminal electrically connects to the second resilient unit.

18. The optical element driving mechanism as claimed in claim 17, wherein the first terminal, the second terminal, the third terminal, and the fourth terminal are in different heights in the first direction.

* * * * *